(12) United States Patent
Ozarkar et al.

(10) Patent No.: US 11,115,142 B1
(45) Date of Patent: Sep. 7, 2021

(54) TIMING SYNCHRONIZATION SERVICE AND DISTRIBUTION SYSTEM

(71) Applicant: Equinix, Inc., Redwood City, CA (US)

(72) Inventors: Anand Ozarkar, San Jose, CA (US);
Ankur Sharma, Sunnyvale, CA (US);
Christopher Alan Anderson, Fremont, CA (US); Danjue Li, Dublin, CA (US);
Lance Weaver, San Ramon, CA (US);
Brian J. Lillie, Los Altos, CA (US)

(73) Assignee: Equinix, Inc., Redwood City, CA (US)

( * ) Notice: Subject to any disclaimer, the term of this patent is extended or adjusted under 35 U.S.C. 154(b) by 268 days.

(21) Appl. No.: 16/438,310

(22) Filed: Jun. 11, 2019

Related U.S. Application Data

(60) Provisional application No. 62/784,165, filed on Dec. 21, 2018.

(51) Int. Cl.
*H04J 3/06* (2006.01)
*G06F 1/12* (2006.01)

(52) U.S. Cl.
CPC .............. *H04J 3/067* (2013.01); *G06F 1/12* (2013.01)

(58) Field of Classification Search
USPC ........................................................ 379/329
See application file for complete search history.

(56) References Cited

U.S. PATENT DOCUMENTS

| 7,475,272 | B2 | 1/2009 | Carlson et al. |
| 7,876,791 | B2 | 1/2011 | Jung et al. |
| 8,384,590 | B2 | 2/2013 | Huang et al. |
| 8,467,487 | B2 | 6/2013 | Garner et al. |
| 8,549,341 | B2 | 10/2013 | Shahid et al. |
| 8,644,348 | B2 | 2/2014 | Zampetti |
| 8,705,578 | B2 | 4/2014 | Yanbin et al. |
| 9,515,756 | B2 | 12/2016 | Khoury et al. |

(Continued)

FOREIGN PATENT DOCUMENTS

| DE | 102017127431 A1 | 5/2018 |
| EP | 2947795 A1 | 11/2015 |
| WO | 2013048770 A1 | 4/2013 |

OTHER PUBLICATIONS

"IEEE Standard for a Precision Clock Synchronization Protocol for Networked Measurement and Control Systems," IEEE Instrumentation and Measurement Society, IEEE Std 1588-2008, Jul. 2008, 289 pp.

(Continued)

*Primary Examiner* — Gregory B Sefcheck
*Assistant Examiner* — Majid Esmaeilian
(74) *Attorney, Agent, or Firm* — Shumaker & Sieffert, P.A.

(57) ABSTRACT

This disclosure describes techniques for delivering high-accuracy and high-precision clock synchronization in heterogeneous distributed computer clusters. For example, the disclosure describes a synchronization engine that sets efficient clock synchronization processes based on a cluster node's characteristics, pricing, precision, geolocation, and/or cluster topology, while in some cases using a combination of master clock data with internal atomic clocks of computers. The techniques described herein integrate the synchronization engine into a time synchronization process that may provide stability, versatility, precision and cost balance using technical improvements for characterizing timing system delivery channels.

19 Claims, 13 Drawing Sheets

(56) References Cited

U.S. PATENT DOCUMENTS

| | | | |
|---|---|---|---|
| 9,886,267 B2 | 2/2018 | Maheshwari et al. | |
| 9,948,552 B2 | 4/2018 | Teng et al. | |
| 2007/0147562 A1 | 6/2007 | Eidson | |
| 2010/0020909 A1* | 1/2010 | Jung | H04J 3/0667 |
| | | | 375/371 |
| 2010/0074383 A1 | 3/2010 | Lee et al. | |
| 2011/0064091 A1 | 3/2011 | Darras et al. | |
| 2011/0075685 A1* | 3/2011 | Xu | H04L 27/2672 |
| | | | 370/503 |
| 2011/0222421 A1* | 9/2011 | Jana | H04W 12/122 |
| | | | 370/252 |
| 2019/0356402 A1 | 11/2019 | Hummen et al. | |

OTHER PUBLICATIONS

Geng et al., "Self-Programming Networks: Architecture and Algorithms," Fifty-Fifth Annual Allerton Conference, Oct. 3-6, 2017, pp. 745-752.
Mills et al., "Internet Time Synchronization: The Network Time Protocol," IEEE Transactions on Communications, vol. 39, No. 10, Oct. 1991, pp. 1482-1493.
Markets in Financial Instruments Directive II—European Securities and Markets Authority, MiFID II—ESMA, available at https://www.esma.europa.eu/policy-rules/mifid-ii-and-mifir, Feb. 18, 2018, 4 pp.
"Architecture and Requirements for Packet-Based Time and Phase Distribution," ITU-T, G.8275/Y.1369, Aug. 2017, 38 pp.
"Rule 613 (Consolidated Audit Trail)," Securities and Exchange Commission, Apr. 19, 2019, 5 pp.

* cited by examiner

FIG. 7 — New Customer Onboarding Flow

TIMING SYNCHRONIZATION SERVICE AND DISTRIBUTION SYSTEM

This application claims the benefit of U.S. Provisional Application No. 62/784,165, filed Dec. 21, 2018, the entire content of which is incorporated by reference herein.

TECHNICAL FIELD

The disclosure relates to time synchronization.

BACKGROUND

A synchronization system, in general, synchronizes clocks of multiple devices based on the clock of a chosen master device (also referred to as a "primary" device or a "leader" device). The master device is a computing device that gets time synchronization data from other master devices or intelligent engines deployed either inside or outside of the synchronization system, such as a global positioning system (GPS). The typical synchronization system has one layer of master devices with other end devices (also referred to as "slave" devices, "replica" devices, or "follower" devices) connected to at least one master device. Master devices are connected to the more precise sources of timestamps. In some implementations, master devices may belong to a service provider and can be designed to support precise time processing, while end devices may belong to the service client and receive timestamp offsets from master devices. These master and end devices can be chosen arbitrarily or assigned by the network.

In many applications, including but not limited to financial, scientific, military, and gaming industries, time synchronization may be beneficial. For instance, such knowledge would be used to define trade orders in high-frequency trading systems and gamers response in multi-user games.

SUMMARY

In general, the disclosure describes techniques to provide a timing synchronization service and distribution system. For example, a local system master clock in a network may perform the time synchronization processes as described herein using information obtained from probing device pairs. For instance, the pair of probing devices, which can be end devices in a cluster as described herein, may exchange timestamps in order to determine upper-bound delta times and lower-bound delta times for the probing device pair. These delta times may account for time spent traversing the multi-cloud environment and any errors that may be present in the system. A probing device may also use these delta times to calculate slope values and intercept values, which the probing device provides to the local system master clock such that the local system master clock can calculate timestamp offsets to be applied to the probing device. The timing synchronization service may be distributed globally to provide high precision timing to clocks located in multiple cloud environments. The timing synchronization service may be distributed using one or more cloud exchanges, which interconnect the multiple cloud environments to the timing synchronization service.

The techniques may in this way provide the technical advantage of increased accuracy and precision in timing synchronization over long distances. In some cases, the timing synchronization service may provide sub-microsecond precision for consumption by customer applications, networks, and cloud systems at a regional or global scale.

In one example, a method includes sending, by a first probing device in a network comprising a plurality of probing devices, and to a second probing device of the plurality of probing devices in the network, a timestamp for the first probing device, wherein the first probing device and the second probing device are included in a probing device pair, receiving, by the first probing device, and from the second probing device, a timestamp for the second probing device, determining, by the first probing device, based at least in part on the timestamp for the first probing device and the timestamp for the second probing device, an upper-bound delta time and a lower-bound delta time for the probing device pair, calculating, by the first probing device, and based at least in part on the upper-bound delta time and the lower-bound delta time for the probing device pair, a slope value and an intercept value for the first probing device, and sending, by the first probing device, and to a local system master clock, the slope value and the intercept value for the first probing device.

In another example, a first probing device includes one or more processors operably coupled to a memory and a synchronization engine executable by the one or more processors to send, to a second probing device of a plurality of probing devices in a network, a timestamp for the first probing device, wherein the first probing device and the second probing device are included in a probing device pair, receive, from the second probing device, a timestamp for the second probing device, determine, based at least in part on the timestamp for the first probing device and the timestamp for the second probing device, an upper-bound delta time and a lower-bound delta time for the probing device pair, calculate, based at least in part on the upper-bound delta time and the lower-bound delta time for the probing device pair, a slope value and an intercept value for the first probing device, and send, to a local system master clock, the slope value and the intercept value for the first probing device.

In another example, a first probing device includes means for sending, to a second probing device of a plurality of probing devices in a network, a timestamp for the first probing device, wherein the first probing device and the second probing device are included in a probing device pair, means for receiving, from the second probing device, a timestamp for the second probing device, means for determining, based at least in part on the timestamp for the first probing device and the timestamp for the second probing device, an upper-bound delta time and a lower-bound delta time for the probing device pair, means for calculating, based at least in part on the upper-bound delta time and the lower-bound delta time for the probing device pair, a slope value and an intercept value for the first probing device, and means for sending, to a local system master clock, the slope value and the intercept value for the first probing device.

In another example, a non-transitory computer readable medium includes instructions that, when executed by one or more processors of a first probing device, cause the one or more processors to send, to a second probing device of a plurality of probing devices in a network, a timestamp for the first probing device, wherein the first probing device and the second probing device are included in a probing device pair, receive, from the second probing device, a timestamp for the second probing device, determine, based at least in part on the timestamp for the first probing device and the timestamp for the second probing device, an upper-bound delta time and a lower-bound delta time for the probing device pair, calculate, based at least in part on the upper-bound delta time and the lower-bound delta time for the the first probing device, and send, to a local system master clock, the slope value and the intercept value for the first probing device.

In another example, a method includes receiving, by a local system master clock, and from a first probing device, a slope value and an intercept value for the first probing device, calculating, by the local system master clock, and based at least in part on the slope value and the intercept value for the first probing device, a timestamp offset for the first probing device, and sending, by the local system master clock, and to the first probing device, the timestamp offset for the first probing device.

In another example, a local system master clock includes one or more processors operably coupled to a memory and a synchronization engine executable by the one or more processors to receive, from a first probing device, a slope value and an intercept value for the first probing device, calculate, based at least in part on the slope value and the intercept value for the first probing device, a timestamp offset for the first probing device, and send, to the first probing device, the timestamp offset for the first probing device.

In another example, a local system master clock includes means for receiving, and from a first probing device, a slope value and an intercept value for the first probing device, means for calculating, based at least in part on the slope value and the intercept value for the first probing device, a timestamp offset for the first probing device, and means for sending, to the first probing device, the timestamp offset for the first probing device.

In another example, a non-transitory computer readable medium includes instructions that, when executed by one or more processors of a local system master clock, cause the one or more processors to receive, from a first probing device, a slope value and an intercept value for the first probing device, calculate, based at least in part on the slope value and the intercept value for the probing device pair, a timestamp offset for the first probing device, and send, to the first probing device, the timestamp offset for the first probing device.

In another example, a system includes a first probing device, a second probing device, and a local system master clock, wherein the first probing device is configured to send, to the second probing device, a timestamp for the first probing device, wherein the first probing device and the second probing device are included in a probing device pair, receive, from the second probing device, a timestamp for the second probing device, determine, based at least in part on the timestamp for the first probing device and the timestamp for the second probing device, an upper-bound delta time and a lower-bound delta time for the probing device pair, calculate, based at least in part on the upper-bound delta time and the lower-bound delta time for the probing device pair, a slope value and an intercept value for the first probing device, and send, to the local system master clock, the slope value and the intercept value for the first probing device, and wherein the local system master clock is configured to receive, from the first probing device, the slope value and the intercept value for the first probing device, calculate, based at least in part on the slope value and the intercept value for the first probing device, a timestamp offset for the first probing device, and send, to the first probing device, the timestamp offset for the first probing device.

In another example, a local system master clock includes one or more processors operably coupled to a memory and a synchronization engine executable by the one or more processors to establish a connection with a reference clock prober device, establish a transmission control protocol (TCP) connection with each of a plurality of probing devices, wherein each probing device of the plurality of the probing devices is a client of the local system master clock, and wherein the local system master clock is located in a same data center as each of the plurality of probing devices, send, to the reference clock prober device, a first list identifying each of the probing devices in the plurality of probing devices, send, to each probing device of the plurality of probing devices, a corresponding list identifying every probing device other than the probing device in the plurality of probing devices, receive, the probing devices and the reference clock prober device, respective offset information and respective drift information for the probing devices and for the reference clock prober device, calculate a network error based on the respective offset information and the respective drift information for all of the probing devices and the reference clock prober device, calculate respective clock correction information for all of the probing devices and for the reference clock prober device based on the network error and the respective offset information and respective drift information for the probing devices and the reference clock prober device, and send respective clock correction information and the network error to the probing devices and to the reference clock prober device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
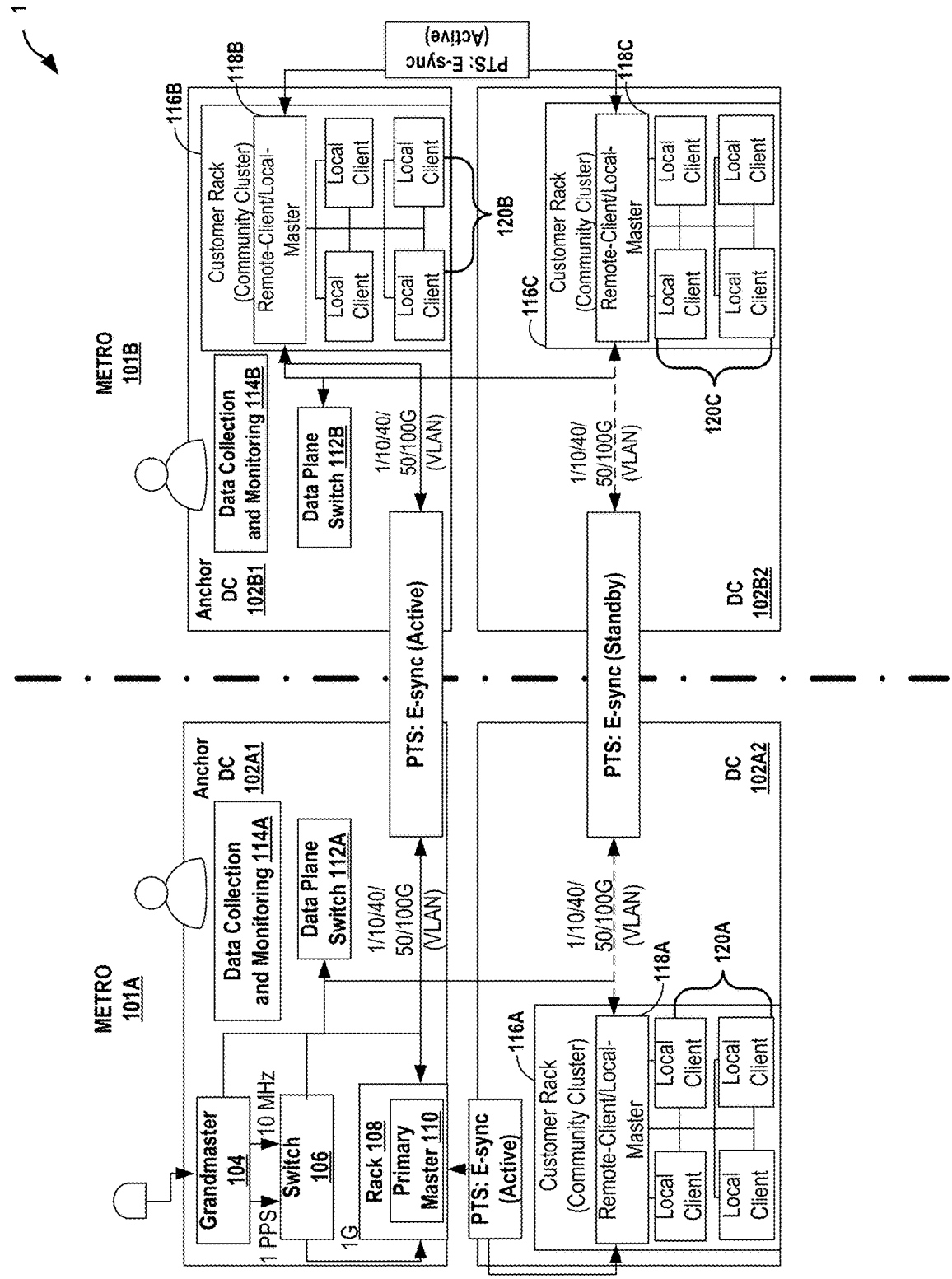
FIG. 1 is a block diagram of an example precision timing system with an inter-regional distribution, in accordance with one or more techniques of the current disclosure.

This disclosure describes techniques for delivering high-accuracy and high-precision clock synchronization in heterogeneous distributed computer clusters. For example, the disclosure describes a synchronization engine that sets efficient clock synchronization processes based on a cluster node's characteristics, pricing, precision, geolocation, and/or cluster topology, while in some cases using a combination of master clock data with internal atomic clocks of computers. The techniques described herein integrate the synchronization engine into a time synchronization process that may provide stability, versatility, precision and cost balance using technical improvements for characterizing timing system delivery channels.

In one example, the clock synchronization process includes the use of GPS modules that provide precise time signals from satellites, distribution modules (switches) that allow the transfer of a time signal from the GPS module to time management modules, cluster node connection and distribution modules, cluster nodes, and a connection intelligent engine that defines the most effective connection mechanism between the GPS module and cluster nodes.

In another example, the clock synchronization apparatus described herein includes GPS modules that provide precise time signals from satellites, distribution modules (switches) that allow the transfer of a time signal from the GPS module to time management modules, cluster node connection and distribution modules, cluster nodes, a connection intelligent engine that defines the most effective connection mechanism between the GPS module and cluster nodes, and an intelligent synchronization filter module that eliminates potential outliers in the time synchronization process.

In another example, the clock synchronization apparatus described herein includes GPS modules that provide precise time signals from satellites, distribution modules (switches) that allow the transfer of a time signal from the GPS module to time management modules, cluster node connection and distribution modules, cluster nodes, a connection intelligent engine that defines the most effective connection mechanism between the GPS module and cluster nodes, an intelligent synchronization filter module that eliminates potential outliers in the time synchronization process, and a load control engine that changes the time synchronization algorithms based on network load.

Certain arrangements of networks include multiple clusters (also referred to herein as "cluster nodes", "device cluster nodes", or "device clusters"), or sets of devices within geographical proximity to one another. Devices from the same cluster node are typically located in a local-area network (LAN) and have faster access times and lower network loads than cross-cluster devices, so clusters typically act separately from one another. The clusters may include sets of one or more containers or virtual machines executing on servers to provide reference clocks for providing a timing service to customers.

For the purposes of this disclosure, a synchronization system or a system indicates a complex set of devices, algorithms, programs, modules, and components which allow the execution of time synchronization operations.

For the purposes of this disclosure, a device clock indicates an internal clock of the device. A device can have a single device clock or more than one device clock, including one or more of a Network Interface Card (NIC) card clock, a Graphics Processing Unit (GPU) clock, or a central processing unit (CPU) clock.

For the purposes of this disclosure, a system clock indicates a clock associated with the synchronization system. The system clock may be a high precision clock which provides a precise time signal and generates precise timestamps, such as a clock on a GPS. The synchronization system may have more than one system clock.

For the purposes of this disclosure, a timestamp indicates an individual time signal measurement registered by a time measurement device. For the purposes of this disclosure, a device timestamp indicates a timestamp generated by a device. For the purposes of this disclosure, a system timestamp indicates a timestamp computed by the synchronization system. For the purposes of this disclosure, a timestamp offset (also referred to herein as a "time synchronization offsets" and an "offset") indicates a difference between two timestamps. For instance, the timestamp offset may be calculated as a difference between the device timestamp and the system timestamp.

For the purposes of this disclosure, the network time protocol (NTP) is a networking protocol for clock synchronization between computer systems over packet-switched, variable-latency data networks. For the purposes of this disclosure, the precision time protocol (PTP) is a protocol used to synchronize clocks throughout a computer network.

For the purposes of this disclosure, a switch indicates a computer networking device that connects devices together on a computer network by using packet switching to receive, process, and forward data to the destination device. For the purposes of this disclosure, a PTP switch indicates a switch that supports the PTP standard protocol and allows the receipt, processing, and forwarding of timestamps to the destination devices. For the purposes of this disclosure, an NTP Switch indicates a switch that supports the NTP standard protocol and allows the receipt, processing, and forwarding of timestamps to the destination devices. For the purposes of this disclosure, a master switch indicates a special device that allows the receipt, processing and forwarding of time signal from a GPS antenna. For the purposes of this disclosure, a system state indicates a set of parameters that allows the estimation of how loaded and "ready for time synchronization" a system is.

For the purposes of this disclosure, a device cluster node (also referred to herein as a "device cluster," a "cluster," or a "cluster node") indicates a set of devices within geolocation proximity. For the purposes of this disclosure, a cross cluster connection indicates a network connection between different cluster nodes.

For the purposes of this disclosure, a master device (also known as a "primary" device or a "leader" device) indicates a special type of device that gets time synchronization data from other master devices or intelligent engines deployed inside the synchronization system, such as a GPS module in communication with a GPS. For the purposes of this disclosure, an end device (also known as a "slave" device, a "replica" device, or a "follower" device, all of which may be used interchangeably throughout this disclosure) indicates a name of all non-master devices that is typically connected to one or more master devices. For the purposes of this disclosure, cross-cluster master devices (also referred to herein as "cluster master devices") indicate a special set of master devices that distribute timestamp offsets between device clusters.

A secondary device, also referred to herein as a "leaf node," may refer to a secondary master device (e.g., a master device not in direct communication with the GPS but relied on to send synchronization offsets to end devices), a cluster master device (e.g., a master device not in direct communication with the GPS but relied on to send synchronization offsets to both end devices and other secondary master devices within the cluster), or an end device (e.g., also referred to herein as a "probing" device or a "prober").

Modern technology utilizes virtualized resources, distributed systems and edge computing, each of which increase the need for precise timing in order to realize the performance benefits. Two major vectors currently drive the need for sub-microsecond timing. The first is that new regulations and industry standards mandate greater accuracy, reliability, resiliency, transparency and traceability for time and synchronization. These standards include Markets in Financial Instruments Directive II—European Securities and Markets Authority ("MiFID II—ESMA", Finance), G.8275—International Telecommunications Union ("ITU", Telecommunications), Consolidated Audit Trail—Securities and Exchange Commission Rule 613 ("CAT—SEC", Finance), and C37.238-2011—Institute of Electrical and Electronics Engineers ("IEEE", Power).

A second vector driving the need for is the amount of emerging applications, business models, and use cases requiring more stringent timing and synchronization as a foundational component. These include long-term evolution (LTE), Advanced Pro, & 5G frequency and phase synchronization (Telecommunications), globally distributed databases that use time stamping for strict consistency (Enterprise systems), distributed ledger (Blockchain) and high-frequency trading granular chain of custody records (Finance and Enterprise systems), transportation or logistics synchronization for safety-critical applications (Enterprise systems, e.g. drones, autonomous vehicles), industrial automation or Internet of Things component synchronization and integration (Enterprise systems), and critical infrastructure protection and a national preparedness mandate for a viable backup to GPSs (Federal).

Highly accurate timing is a foundational component for high frequency trading in order to create trustworthy records, as well as for emerging applications such as global distributed databases, distributed ledgers, and autonomous vehicles. Using the techniques described herein, a datacenter or cluster may achieve sub-microsecond precision, and may be easily accessible and consumed at the intersection of customer applications, networks, and cloud on a global scale.

There exist certain challenges in industries to provide accurate and precise time in an affordable manner. For instance, services like network time protocol (NTP) are globally scalable but only offer up to millisecond precision and accuracy. Precise timing is offered within the data center and occasionally within the metro up to certain distances. Longer distances, such as beyond 120 km, for precise or accurate time are a difficult to achieve. Precision time protocol (PTP) improves upon precision and accuracy from NTP but accuracy diminishes with distance and devices. White Rabbit (PTPv3) improves PTP even further to have single digit nanosecond level of accuracy and precision. However, both PTP and White Rabbit are costly from a hardware standpoint in terms of distribution. Current solutions may not provide ease of onboarding, except for NTP which may not provide highly accurate or precise time. To maintain precision or accuracy across great distances, multiple time sources may be spread out to provide time to particular regions. Accessibility to timing options is also limited to NTP generally without investing in a GPS timing server.

One example implementation environment for the techniques described herein is within one or more data centers. Data centers may house multiple different types of devices, each owned by different entities, but each of the devices may be linked inside this overall data center structure. Some devices within the data center may exchange data with other devices in the same data center but may also exchange data with devices located in data centers in different geographic or metropolitan areas. As such, data centers may implement the techniques described herein to efficiently and precisely synchronize the clocks on the devices within the same data center. In this way, the techniques described herein may be implemented as a downloadable software plugin on customer equipment in a data center that enables a device in the data center to perform the time synchronization processes as described herein. The techniques described herein may balance multiple characteristics, including scalability, versatility, precision, cost, security, and redundancy.

FIG. 1 is a conceptual diagram of an example precision timing system 1 with an inter-regional distribution, in accordance with one or more techniques of the current disclosure. Timing system 1 provides a geographically distributed, easy-to-consume Precision Timing Service (PTS) solution, which may extend locally, regionally or globally. The design may be built on precision clocks and advanced algorithms to deliver accuracy to microseconds and, in some cases, on the order of nanoseconds while utilizing delivery mechanisms including White Rabbit, PTP (Precision Time Protocol), software clients, and IP or Ethernet distribution through E-Sync Mechanisms.

Metro 101A may include grandmaster 104, which may be in communication with a GPS in order to get accurate timing information. Grandmaster 104 communicates with switch 106 to exchange the timing information. Switch 106 may employ various time protocols, including PTP or White Rabbit. Switch 106 forwards the timing information to primary master 110, which resides in rack 108 in anchor data center 102A1. Using a PTS E-sync algorithm, master 110 may synchronize timing across multiple other client devices, such as clients 120A in customer rack 116A at data center 102A2 in metro 101A or clients 120B in customer rack 116B at anchor data center 102B1 in metro 101B. Local master 118B may then coordinate synchronizing the clocks with clients 120C in customer rack 116C at data center 102B2 in metro 101B. Local masters 118A and 118C may receive the timing information from master 110 or local master 118B and handle the distribution to the client devices at their respective location. Data collection and monitoring modules 114A-114B may collect timing information from client devices across the respective metro 101A or 101B in order to determine the synchronization information, e.g., the offset information. Data plane switches 112A-112B may be data planes within the network configured to communicate the data between devices over the network.

The PTS E-Sync algorithm, with GPS and White Rabbit Solutions deployed in two primary metros 101A and 101B (redundant design) per region, may be able to synchronize the servers or clients at regional scale. End customers 120A-120C may be able to consume the synchronization as a service via routers or switches to existing and new customers across metros, to cloud service providers via ports, to private clouds and enterprise customer data centers, or to customers using either Linux or Windows environments. In Linux environments, the end client service could be deployed in any Linux-based system running on a bare metal server, or a virtual environment or a container environment.

Regional deployment of the solution may be serving the accuracy needs of various sectors locally and remotely based on the distribution of high precision time with <100 µs of accuracy to PTS clients locally within same data center, to PTS clients in data centers within same primary metro, to PTS clients in non-primary metros in a region, or to PTS clients in data centers within non-primary metros in a region. The key features of the PTS techniques described herein include multi-tenant, secured, design and onboarding capabilities, high availability design at all levels from GPS time server till PTS clients, traceability up to GPS, additional logging or debugging capabilities, and API or Portal based access for integration with different kinds of end systems and users.

Figure 2:
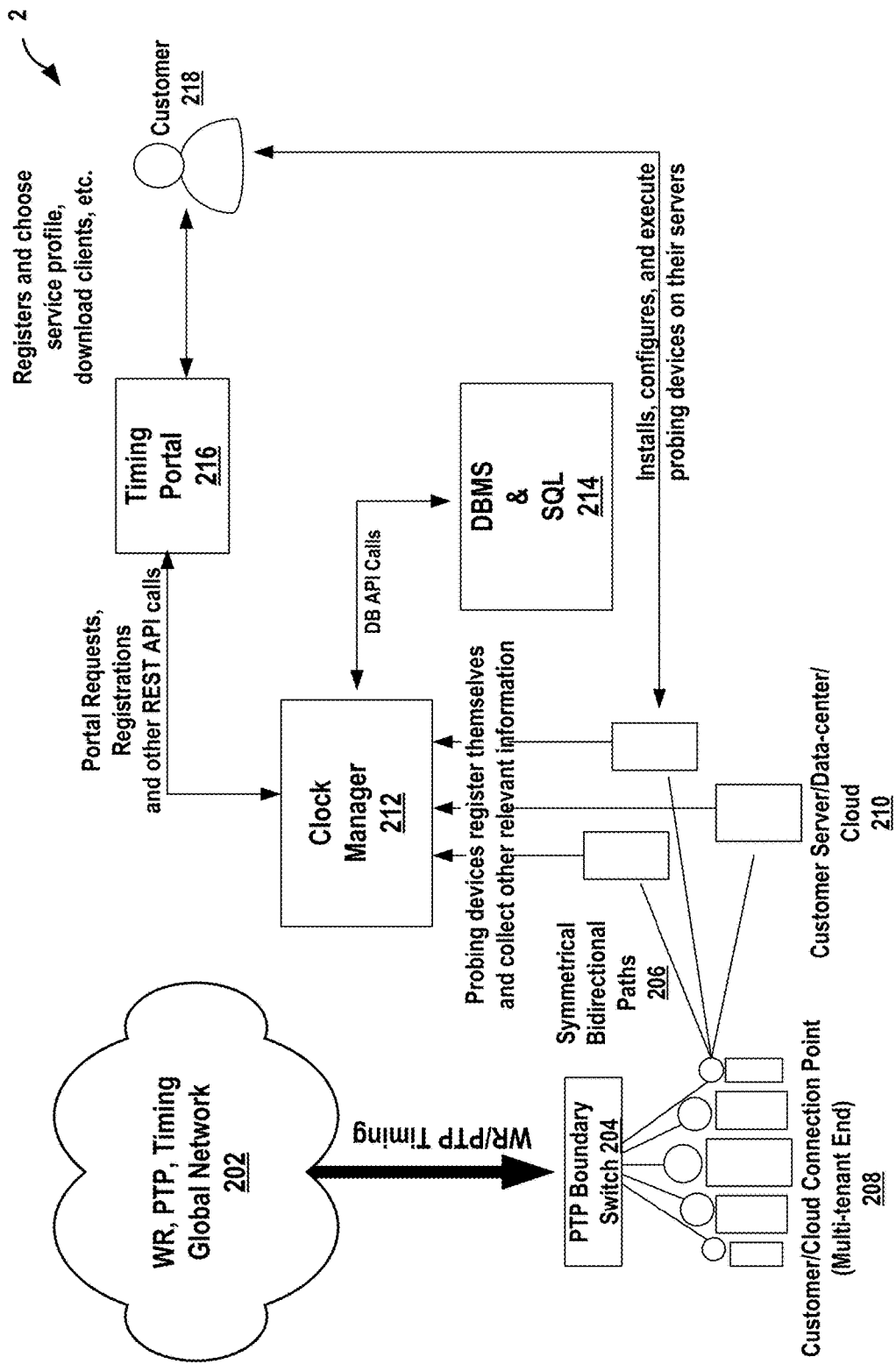
FIG. 2 is a block diagram of an example software architecture workflow of one or more techniques in accordance with one or more techniques of the current disclosure.

FIG. 2 is a block diagram of an example software architecture workflow 2 of one or more techniques in accordance with the current disclosure. Various components involved in the architecture and functionality associated with them.

In the example of FIG. 2, PTP boundary switch 204 receives WR or PTP timing information from global network 202, and forwards this timing information to cloud connection points 208. Cloud connection points 208 and servers 210 exchange device-specific information over symmetrical bidirectional paths 206. Using this device specific information, servers 210 register themselves and send other relevant information to clock manager 212. Clock manager 212 may store and retrieve this information from database management system 214 using API calls. Customer 218 may access the functionality of clock manager 212 via timing portal 216 on a client device.

The clock master may run as docker or non-docker service, correct network effects and edge-errors, check validation for new probers establishing connections with this master, provide a database validation API, and check a status or flag for API calls. There may be one cluster per tenant or one cluster per one hundred probers. Each cluster may have up to three clock masters.

The clock prober may send pairs of packets, collect timestamp data, filter robes, and run support vector machines (SVMs). Considering that new customers have registered via a timing portal, the customer can now access timing service or products page. The customer will download and install this probing device locally on his server with a timestamping network interface card (NIC). The clock prober may further validate if timestamping NICs are available on a customer server, and the clock prober may start and register with the nearest clock manager. The clock prober may have no access to the database management system (DBMS), for security.

In a machine learning method, the SVM may be used to get the clock offset and drift. The SVM runs at each probing device, with upper bound data and lower bound data as the inputs and boundaries, slope, IntercPTS, drift, and offset as the outputs.

In another machine learning method, the Minimum Norm Solution may be used for network effect correction. This method runs inside the master to identify the error in edges and compute the consensus for each edge.

The clock manager may collect initial information from new probers, masters, reference clocks for registration, register or de-register new probers, masters, reference clocks, perform database management system read or write operations, handle failover, fallback for the master and reference clock, share the nearest master IP or Port information with probers, based on the most appropriate master's availability, to enable their services, keep registration and master information application programing interfaces (APIs) separate for re-usability, manage the pool of masters and reference clocks, and integrate with APIs for any customers planning to use software-only services.

The database may store information related to probers, masters, and reference clocks, store information related to synchronization topology, and store any trend or anomaly information. All computations and mathematical operations may be done in memory. Probers may not have access to the database. A time-series database may not be used to store data over time, as customers only need to see that clocks are synchronized and what is the current offset and drift.

The reference clock prober may be similar to the probing device but used only as a reference service. A flag may be used to differentiate between a prober and a reference clock.

The timing portal may view server clock synchronizations, user-friendly graphs, register new clients and masters, request for more services, upgrade or downgrade services, manage clients and masters, build redundancy, view immediate synchronization topology, and manage tenants.

Figure 3:
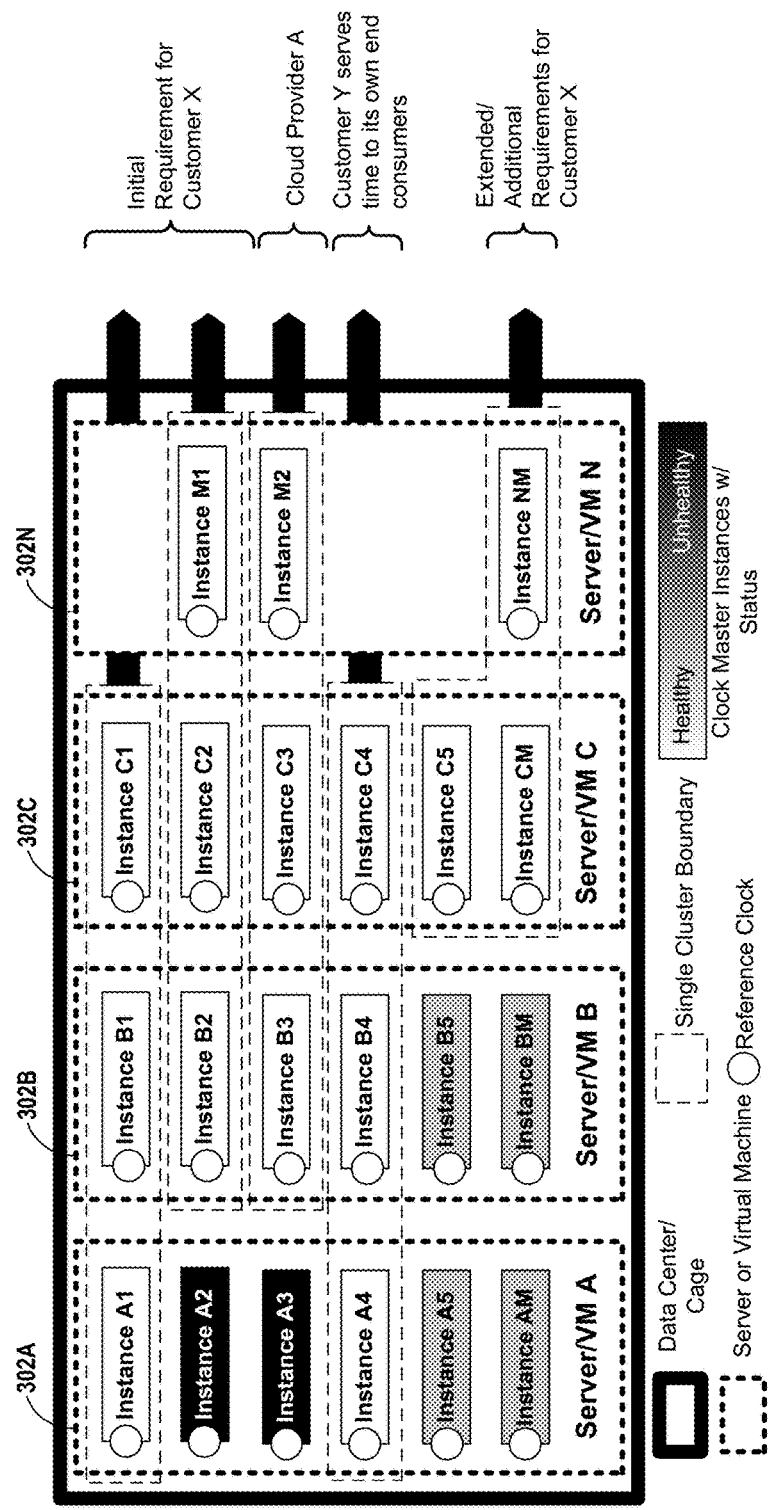
FIG. 3 is a block diagram illustrating an example clustering for a precision timing system configured to perform one or more techniques in accordance with one or more techniques of the current disclosure.

FIG. 3 is a block diagram illustrating an example clustering for a precision timing system 3 configured to perform one or more techniques in accordance with the current disclosure. In a data center, there may be M number of servers or virtual machines (VMs) 302A-302N, and N number of clock master instances and connected reference clocks instances running for each clock master instance. Each clock master instance ("instance" in FIG. 3) may be running on a separate docker-container.

For deployment, the system may connect clock master A1 instance to its local reference clock running on Server or VM 302A. The system may also connect clock master A1 instance to non-local reference clock running on Nth Server or VM where N is not the Ath server. For virtual clustering, based on the logic of the clock master allocation algorithm, at a time, three clock master instances may be allocated to each probing device. These three clock master instances may be running or started on any Server or VM.

These three instances may not be actively used at the same time by probing clients but may act as primary, secondary and tertiary instances and will become active or inactive in case of failover or fallback only.

Figure 4:
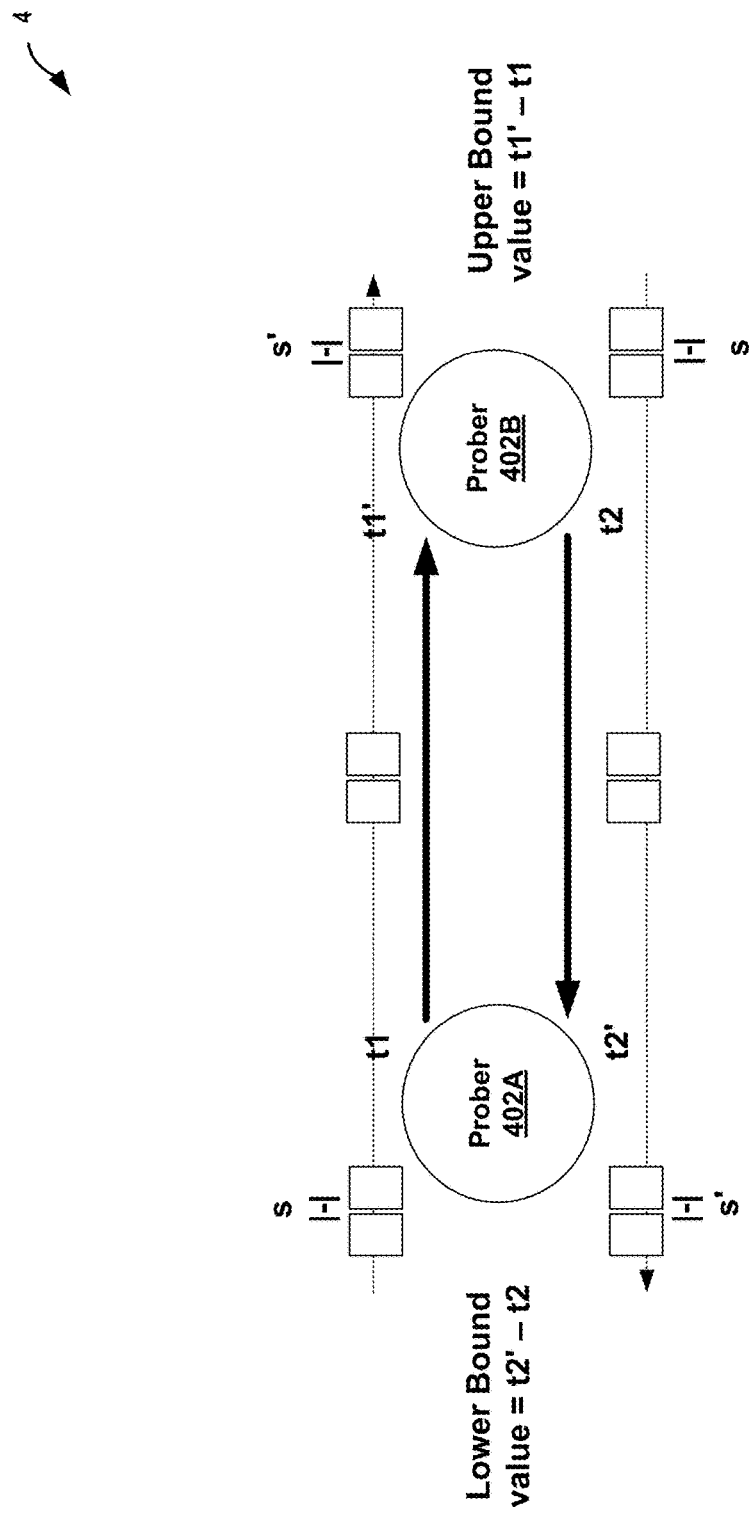
FIG. 4 is a conceptual diagram illustrating an example interaction between probing devices configured to perform one or more techniques in accordance with the current disclosure.

FIG. 4 is a conceptual diagram illustrating an example interaction 4 between probing devices 402A and 402B configured to perform one or more techniques in accordance with the current disclosure. The forward and reverse probes provide upper bound and lower bound delta time values (from multiple exchanges), as shown in FIG. 4.

Figure 5:
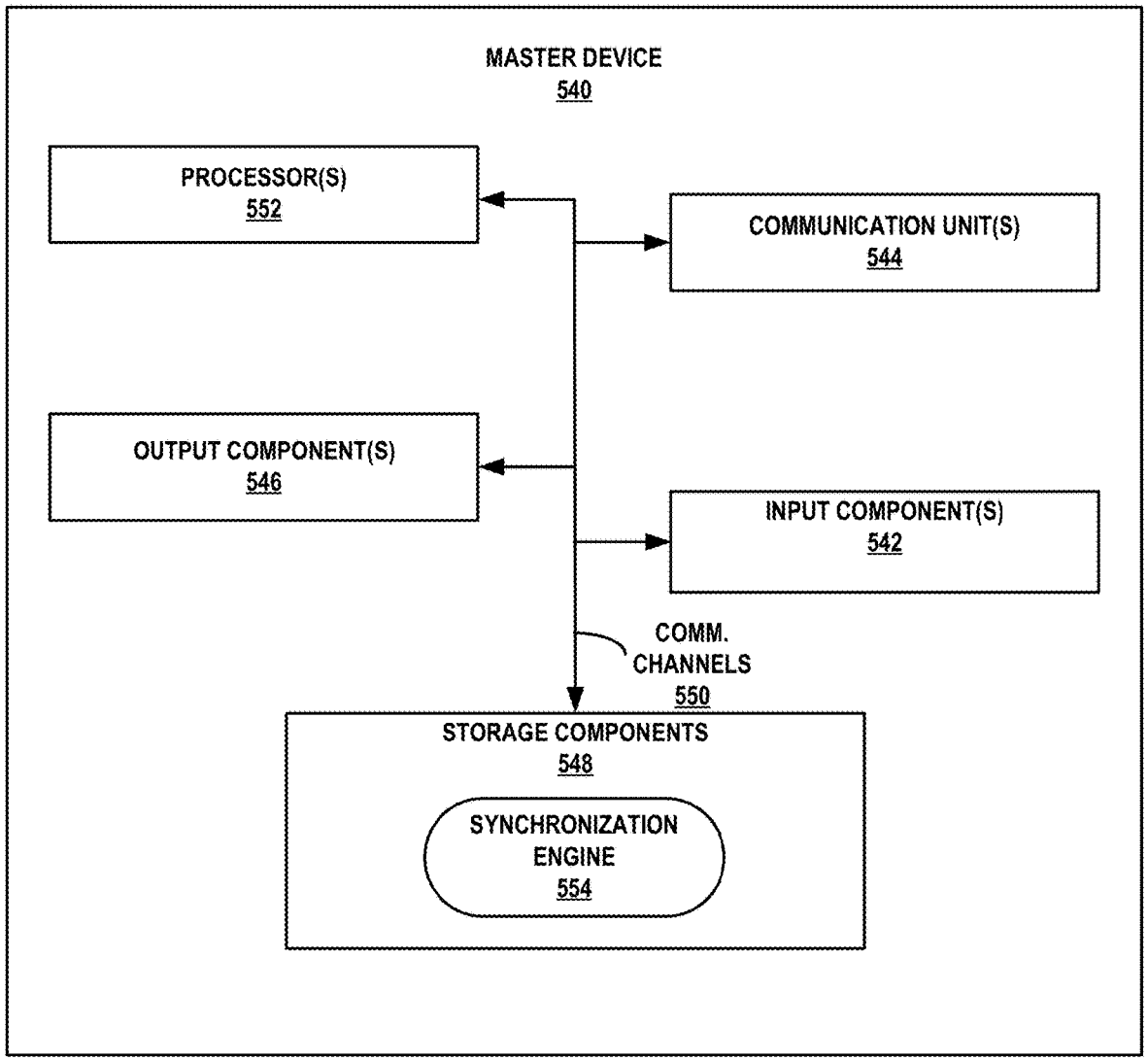
FIG. 5 is a block diagram of a more detailed view of a master device that may be configured to perform one or more techniques in accordance with the current disclosure.

FIG. 5 is a block diagram of a more detailed view of a master device 540 that may be configured to perform one or more techniques in accordance with the current disclosure. FIG. 5 illustrates only one example of master device 540, and many other examples of master device 4 may be used in other instances and may include a subset of the components included in example master device 540 or may include additional components not shown in example master device 540 of FIG. 5.

As shown in the example of FIG. 5, master device 540 includes one or more processors 552, one or more input components 542, one or more communication units 544, one or more output components 546, and one or more storage components 548. Storage components 548 of master device 540 include synchronization engine 554. Communication channels 550 may interconnect each of the components 542, 544, 546, 548, 552, and 554 for inter-component communications (physically, communicatively, and/or operatively). In some examples, communication channels 550 may include a system bus, a network connection, an inter-process communication data structure, or any other method for communicating data.

One or more communication units 544 of master device 540 may communicate with external devices, via one or more wired and/or wireless networks by transmitting and/or receiving network signals on the one or more networks. Examples of communication units 544 include a network interface card (e.g. such as an Ethernet card), an optical transceiver, a radio frequency transceiver, a GPS receiver, or any other type of device that can send and/or receive information. Other examples of communication units 544 may include short wave radios, cellular data radios, wireless network radios, as well as universal serial bus (USB) controllers.

One or more input components 542 of master device 540 may receive input. Examples of input are tactile, audio, and video input. Input components 542 of master device 540, in one example, includes a presence-sensitive input device (e.g., a touch sensitive screen, a PSD), mouse, keyboard, voice responsive system, video camera, microphone or any other type of device for detecting input from a human or machine. In some examples, input components 542 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 546 of master device 540 may generate output. Examples of output are tactile, audio, and video output. Output components 46 of master device 540, in one example, includes a PSD, sound card, video graphics adapter card, speaker, cathode ray tube (CRT) monitor, liquid crystal display (LCD), or any other type of device for generating output to a human or machine.

One or more processors 552 may implement functionality and/or execute instructions associated with master device 540. Examples of processors 552 include application processors, display controllers, auxiliary processors, one or more sensor hubs, and any other hardware configure to function as a processor, a processing unit, or a processing device. Synchronization engine 554 may be operable by processors 552 to perform various actions, operations, or functions of master device 540. For example, processors 552 of master device 540 may retrieve and execute instructions stored by storage components 548 that cause processors 552 to perform the operations of synchronization engine 554. The instructions, when executed by processors 552, may cause master device 540 to store information within storage components 548.

One or more storage components 548 within master device 540 may store information for processing during operation of master device 540 (e.g., master device 540 may store data accessed by synchronization engine 554 during execution at master device 540). In some examples, storage component 548 is a temporary memory, meaning that a primary purpose of storage component 548 is not long-term storage. Storage components 548 on master device 540 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 548, in some examples, also include one or more computer-readable storage media. Storage components 548 in some examples include one or more non-transitory computer-readable storage mediums. Storage components 548 may be configured to store larger amounts of information than typically stored by volatile memory. Storage components 548 may further be configured for long-term storage of information as non-volatile memory space and retain information after power on or off cycles. Examples of non-volatile memories include magnetic hard discs, optical discs, floppy discs, flash memories, or forms of electrically programmable memories (EPROM) or electrically erasable and programmable (EEPROM) memories. Storage components 548 may store program instructions and/or information (e.g., data) associated with synchronization engine 554. Storage components 548 may include a memory configured to store data or other information associated with synchronization engine 554.

In accordance with the techniques of this disclosure, synchronization engine 554 may receive, from a first probing device, a slope value and an intercept value for the first probing device. The probing device pair includes the first probing device and a second probing device. Synchronization engine 554 may also calculate, based at least in part on the slope value and the intercept value for the first probing device, a timestamp offset for the first probing device. Synchronization engine 554 may then send, to the first probing device, the timestamp offset for the first probing device.

In some examples, synchronization engine 554 may also determine one or more of a network error or a network effect in a network that includes master device 540 and the first probing device. Synchronization engine 554 may then update the timestamp offset for the first probing device based on the network error and/or the network effect.

In further accordance with the techniques described herein, synchronization engine 554 establishes a connection with a reference clock prober device. Synchronization engine 554 establishes a transmission control protocol (TCP) connection with each of a plurality of probing devices. Each probing device of the plurality of the probing devices is a client of the local system master clock, and the local system master clock is located in a same data center as each of the plurality of probing devices. Synchronization engine 554 sends, to the reference clock prober device, a first list identifying each of the probing devices in the plurality of probing devices. Synchronization engine 554 also sends, to each of the plurality of probing devices, a respective list identifying every probing device other than the respective probing device in the plurality of probing devices.

Synchronization engine 554 receives, from each of the plurality of probing devices and the reference clock prober device, respective offset information and respective drift information for the probing devices and for the reference clock prober device. Synchronization engine 554 calculates a network error based on the respective offset information and the respective drift information for all of the probing devices and the reference clock prober device. Synchronization engine 554 further calculates respective clock correction information for all of the probing devices and for the reference clock prober device based on the network error and the respective offset information and respective drift information for the probing devices and the reference clock prober device. Synchronization engine 554 sends the respective clock correction information and the network error to the probing devices and to the reference clock prober device.

Figure 6:
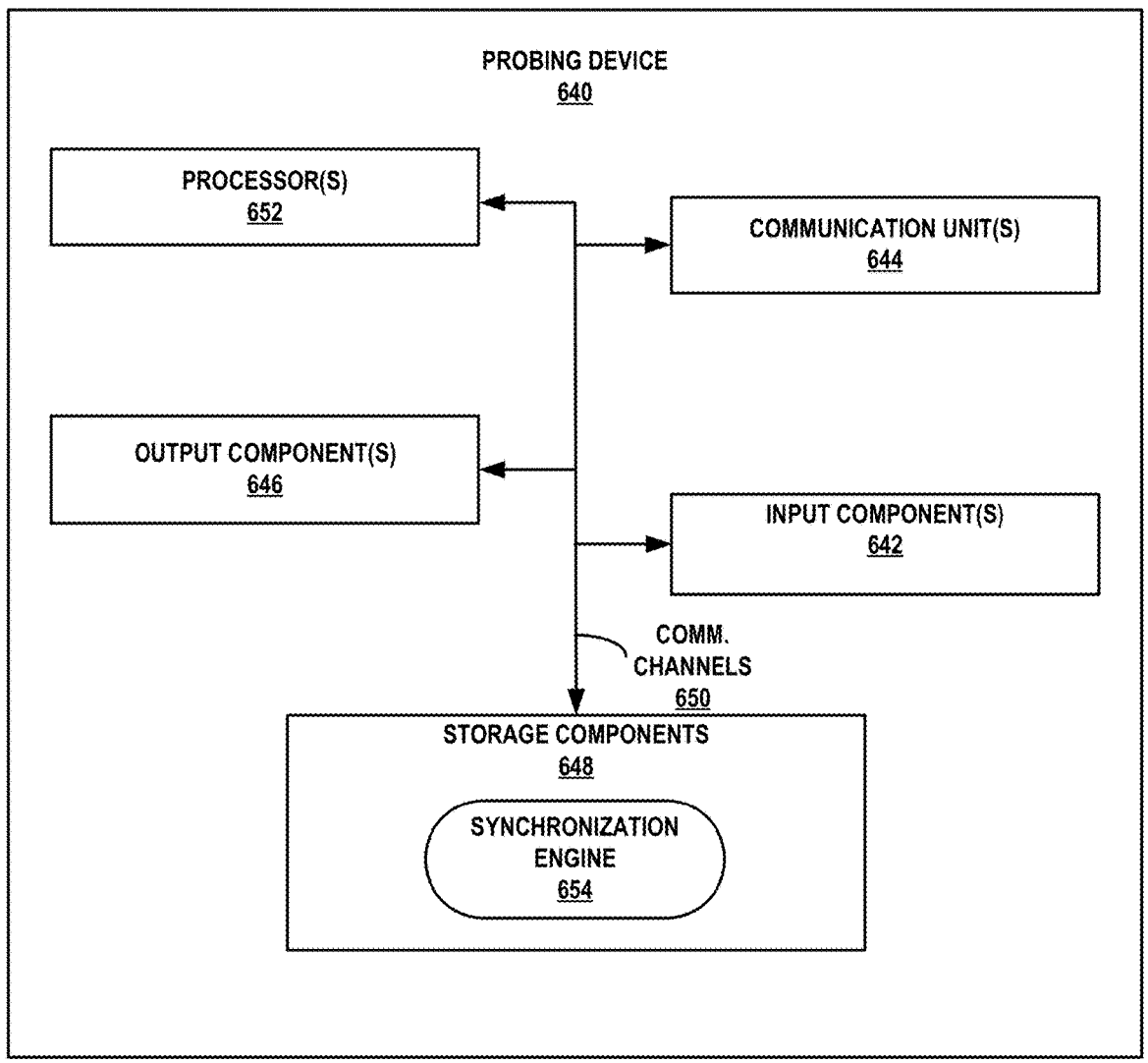
FIG. 6 is a block diagram of a more detailed view of a probing device that may be configured to perform one or more techniques in accordance with the current disclosure.

FIG. 6 is a block diagram of a more detailed view of a probing device 640 that may be configured to perform one or more techniques in accordance with the current disclosure. FIG. 6 illustrates only one example of probing device 640, and many other examples of probing device 640 may be used in other instances and may include a subset of the components included in example probing device 640 or may include additional components not shown in example probing device 640 of FIG. 6.

As shown in the example of FIG. 6, probing device 640 includes one or more processors 652, one or more input components 642, one or more communication units 644, one or more output components 646, and one or more storage components 648. Storage components 648 of probing device 640 include synchronization engine 654. Communication channels 650 may interconnect each of the components 642, 644, 646, 648, 652, and 654 for inter-component communications (physically, communicatively, and/or operatively). In some examples, communication channels 650 may include a system bus, a network connection, an inter-process communication data structure, or any other method for communicating data.

One or more communication units 644 of probing device 640 may communicate with external devices via one or more wired and/or wireless networks by transmitting and/or receiving network signals on the one or more networks. Examples of communication units 644 include a network interface card (e.g. such as an Ethernet card), an optical transceiver, a radio frequency transceiver, a GPS receiver, or any other type of device that can send and/or receive information. Other examples of communication units 644 may include short wave radios, cellular data radios, wireless network radios, as well as universal serial bus (USB) controllers.

One or more input components 642 of probing device 640 may receive input. Examples of input are tactile, audio, and video input. Input components 642 of probing device 640, in one example, includes a presence-sensitive input device (e.g., a touch sensitive screen, a PSD), mouse, keyboard, voice responsive system, video camera, microphone or any other type of device for detecting input from a human or machine. In some examples, input components 642 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 646 of probing device 640 may generate output. Examples of output are tactile, audio, and video output. Output components 646 of probing device 640, in one example, includes a PSD, sound card, video graphics adapter card, speaker, cathode ray tube (CRT) monitor, liquid crystal display (LCD), or any other type of device for generating output to a human or machine.

One or more processors 652 may implement functionality and/or execute instructions associated with probing device 640. Examples of processors 652 include application processors, display controllers, auxiliary processors, one or more sensor hubs, and any other hardware configure to function as a processor, a processing unit, or a processing device. Synchronization engine 654 may be operable by processors 652 to perform various actions, operations, or functions of probing device 640. For example, processors 652 of probing device 640 may retrieve and execute instructions stored by storage components 648 that cause processors 652 to perform the operations of synchronization engine 654. The instructions, when executed by processors 652, may cause probing device 640 to store information within storage components 648.

One or more storage components 648 within probing device 640 may store information for processing during operation of probing device 640 (e.g., probing device 640 may store data accessed by synchronization engine 654 during execution at probing device 640). In some examples, storage component 648 is a temporary memory, meaning that a primary purpose of storage component 648 is not long-term storage. Storage components 648 on probing device 640 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 648, in some examples, also include one or more computer-readable storage media. Storage components 648 in some examples include one or more non-transitory computer-readable storage mediums. Storage components 648 may be configured to store larger amounts of information than typically stored by volatile memory. Storage components 648 may further be configured for long-term storage of information as non-volatile memory space and retain information after power on or off cycles. Examples of non-volatile memories include magnetic hard discs, optical discs, floppy disks, flash memories, or forms of electrically programmable memories (EPROM) or electrically erasable and programmable (EEPROM) memories. Storage components 648 may store program instructions and/or information (e.g., data) associated with synchronization engine 654. Storage components 648 may include a memory configured to store data or other information associated with synchronization engine 654.

In accordance with the techniques of this disclosure, synchronization engine 654 may send, in a network comprising a plurality of probing devices, and to a second probing device of the plurality of probing devices in the network, a timestamp for probing device 640. Probing device 640 and the second probing device are included in a probing device pair. Synchronization engine 654 may receive, from the second probing device, a timestamp for the second probing device. Synchronization engine 654 may determine, based at least in part on the timestamp for probing device 640 and the timestamp for the second probing device, an upper-bound delta time and a lower-bound delta time for the probing device pair. Synchronization engine 654 may calculate, based at least in part on the upper-bound delta time and the lower-bound delta time for the probing device pair, a slope value and an intercept value for probing device 640. Synchronization engine 654 may send, to a local system master clock (e.g., master device 40 of FIG. 5), the slope value and the intercept value for probing device 640.

In some examples, synchronization engine 654 may further determine a timestamp offset between the timestamp for probing device 640 and the timestamp for the second probing device. Synchronization engine 654 may also receive, from the second probing device, an independent timestamp offset for the probing device pair. Synchronization engine 654 may compare the timestamp offset and the independent timestamp offset and, responsive to determining that the timestamp offset is approximately equal to the independent timestamp offset, classify the timestamp offset as a valid timestamp offset. In such examples, in determining the upper-bound delta time and the lower-bound delta time for the probing device pair, synchronization engine 654 may determine the upper-bound delta time and the lower-bound delta time for the probing device pair only when the timestamp offset is classified as a valid timestamp offset.

Conversely, synchronization engine 654 may send, to the second probing device of the plurality of probing devices in the network, a second timestamp for probing device 640. Synchronization engine 654 may receive, from the second probing device, a second timestamp for the second probing device. Synchronization engine 654 may determine a timestamp offset between the second timestamp for probing device 640 and the second timestamp for the second probing device. Synchronization engine 654 may also receive, from the second probing device, an independent timestamp offset for the probing device pair. Synchronization engine 654 may compare the timestamp offset and the independent timestamp offset. Synchronization engine 654 may, responsive to determining that the timestamp offset is not approximately equal to the independent timestamp offset, classify the timestamp offset as an invalid timestamp offset and, responsive to classifying the timestamp offset as an invalid timestamp offset, refrain from determining a second upper-bound delta time and a second lower-bound delta time for the probing device pair.

In some examples, synchronization engine 654 may send, to the second probing device of the plurality of probing devices in the network, a second timestamp for probing device 640. Synchronization engine 654 may receive, from the second probing device, a second timestamp for the second probing device. Synchronization engine 654 may determine, based at least in part on the timestamp for probing device 640, the timestamp for the second probing device, the second timestamp for probing device 640, and the second timestamp for the second probing device, the upper-bound delta time and the lower-bound delta time for the probing device pair. Synchronization engine 654 may calculate, based at least in part on the upper-bound delta time and the lower-bound delta time for the probing device pair, the slope value and the intercept value for probing device 640. Synchronization engine 654 may send, to the local system master clock, the slope value and the intercept value for probing device 640.

Synchronization engine 654 may repeat this process, sending, to the second probing device of the plurality of probing devices in the network, a third timestamp for probing device 640. Synchronization engine 654 may receive, from the second probing device, a third timestamp for the second probing device. Synchronization engine 654 may determine, based at least in part on the third timestamp for probing device 640, the third timestamp for the second probing device, the upper-bound delta time for the probing device pair, and the lower-bound delta time for the probing device pair, an updated upper-bound delta time and an updated lower-bound delta time for the probing device pair. Synchronization engine 654 may then calculate, based at least in part on the updated upper-bound delta time and the updated lower-bound delta time for the probing device pair, an updated slope value and an updated intercept value for probing device 640, and send, to the local system master clock, the updated slope value and the updated intercept value for probing device 640.

In some examples, synchronization engine 654 may receive, from the local system master clock, a reference clock probe that includes a time synchronization offset for probing device 640. Synchronization engine 654 may synchronize, based at least in part on the time synchronization offset, a clock on probing device 640.

In some examples, in sending the timestamp for probing device 640, synchronization engine 654 may send, to the second probing device, a probe packet that includes the timestamp for probing device 640.

In some examples, synchronization engine 654 may, in calculating the slope value and the intercept value for probing device 640, calculate, using a non-linear model, the upper-bound delta time, and the lower-bound delta time, the slope value and the intercept value for probing device 640. Synchronization engine 654 may also create the non-linear model.

Probing device 640 may repeat this process with other probing devices to determine multiple sets of delta times, plugging each of the received delta times into the non-linear model to generate the slope value and the intercept value for probing device 640. For instance, synchronization engine 654 may send, to a third probing device of the plurality of probing devices in the network, a second timestamp for the first probing device, with probing device 640 and the third probing device being included in a second probing device pair. Synchronization engine 654 may then receive, from the third probing device, a timestamp for the third probing device. Synchronization engine 654 may then determine, based at least in part on the second timestamp for the first probing device and the timestamp for the third probing device, an upper-bound delta time and a lower-bound delta time for the second probing device pair. Synchronization engine 654 may calculate, based at least in part on the upper-bound delta time and the lower-bound delta time for the probing device pair and the upper-bound delta time and the lower-bound delta time for the second probing device pair, the slope value and the intercept value for probing device 640. Synchronization engine 654 may also use the non-linear model along with the multiple upper-bound delta times and the multiple lower-bound delta times in calculating the slope value and the intercept value for probing device 640.

Figure 7:
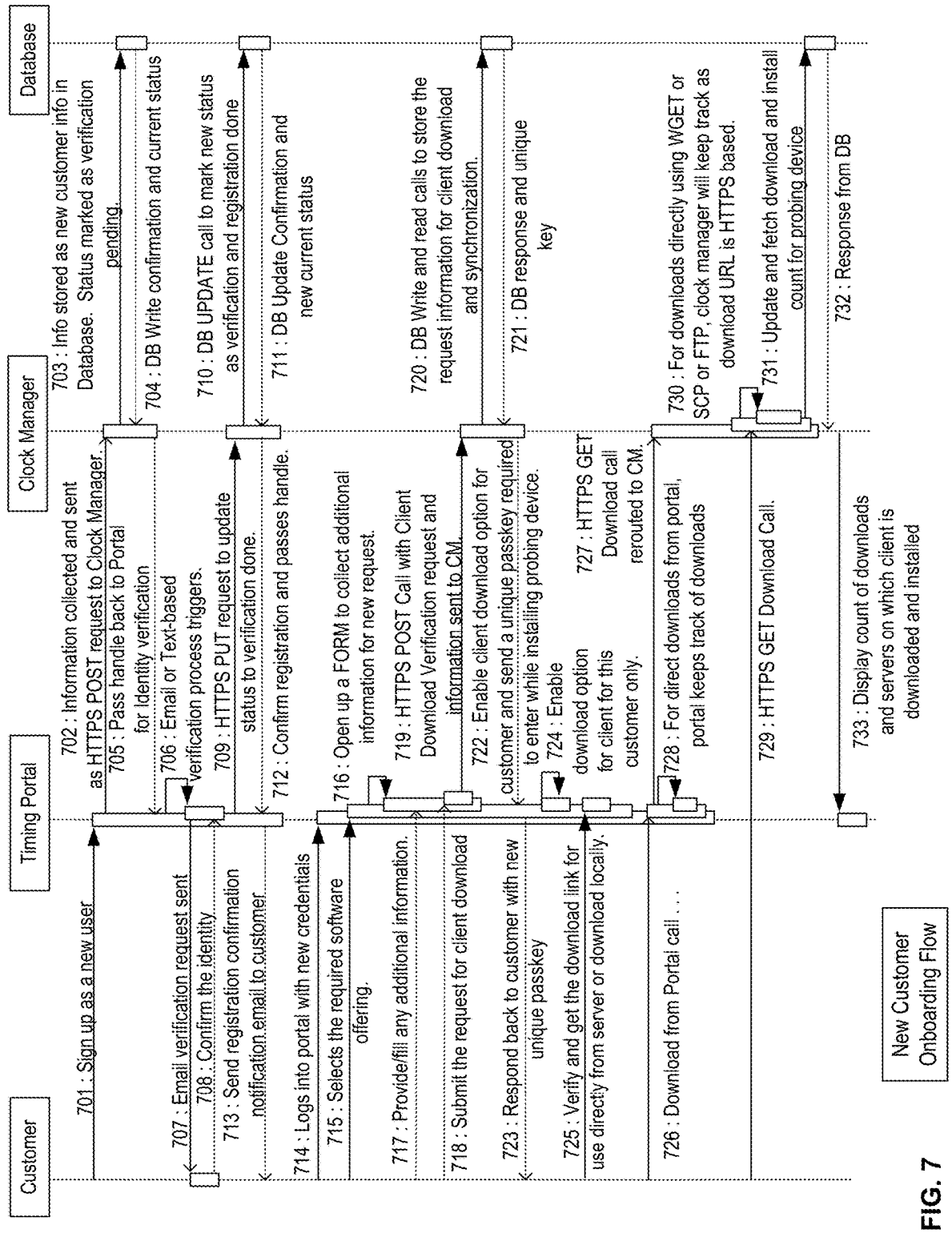
FIG. 7 is a flow diagram illustrating an example new customer onboarding call flow, in accordance one or more techniques of the current disclosure.

FIG. 7 is a flow diagram illustrating an example new customer onboarding call flow, in accordance with one or more techniques of the current disclosure. In this example, the customer, timing portal, clock manager, and database each interact with one another to register a client device in the database when the timing portal is installed on the client device.

In accordance with the techniques described herein, the timing portal receives sign up information entered by a new user (701) and forwards the collected information as an HTTPS POST request to the clock manager (702). The clock manager stores this information in the database as new customer information, and the status in the database is marked as "verification pending" (703). The database outputs a write confirmation and a current status to the clock manager (704), which passes a handle back to the timing portal for identity verification (705).

The received handle triggers a verification process at the timing portal, which may be e-mail or text-based (706). The timing portal sends the email or text verification to the customer (707) and receives an identity confirmation (708). Upon receiving the confirmation, the timing portal sends an HTTPS PUT request to the clock manager to update the status to "verification done" (709), and the clock manager updates the database to reflect the new status (710). The database sends a confirmation message to the clock manager (711), which passes another handle and confirmation message to the timing portal (712). The timing portal sends a registration confirmation notification to the customer (713).

Once the customer is registered, the timing portal receives a log-in request from the customer with credentials (714), as well as a selection of a required software offering (715). The timing portal opens a form to collect additional information (716), which the timing portal receives from the customer (717). The timing portal also receives a request for a client program download (718), which the timing portal forwards to the clock manager (719). The clock manager sends information about the customer requesting the download and a request for the download to the database (720), and the database responds with a unique download key (721). The clock manager enables the client download and sends the unique download key to the timing portal (722), which forwards the download key to the customer for entry when installing the probing device program (723). The timing portal then enables the download option for this particular customer (724).

The timing portal receives the request for the download link (725), as well as the download request (726), from the customer. The timing portal sends an HTTPS GET message to the clock manager for the client program (727). For direct downloads from the timing portal, the timing portal itself keeps track of the download progress (728). For server downloads, the clock manager receives an HTTPS GET download call from the customer (730) and the clock manager keeps track of the download progress. Once the download is completed, the clock manager updates and fetches download and install counts for the client program (731) and receives this information from the database (732). The timing portal then displays the count of downloads and servers on which the client program is downloaded and installed (733).

Figure 8:
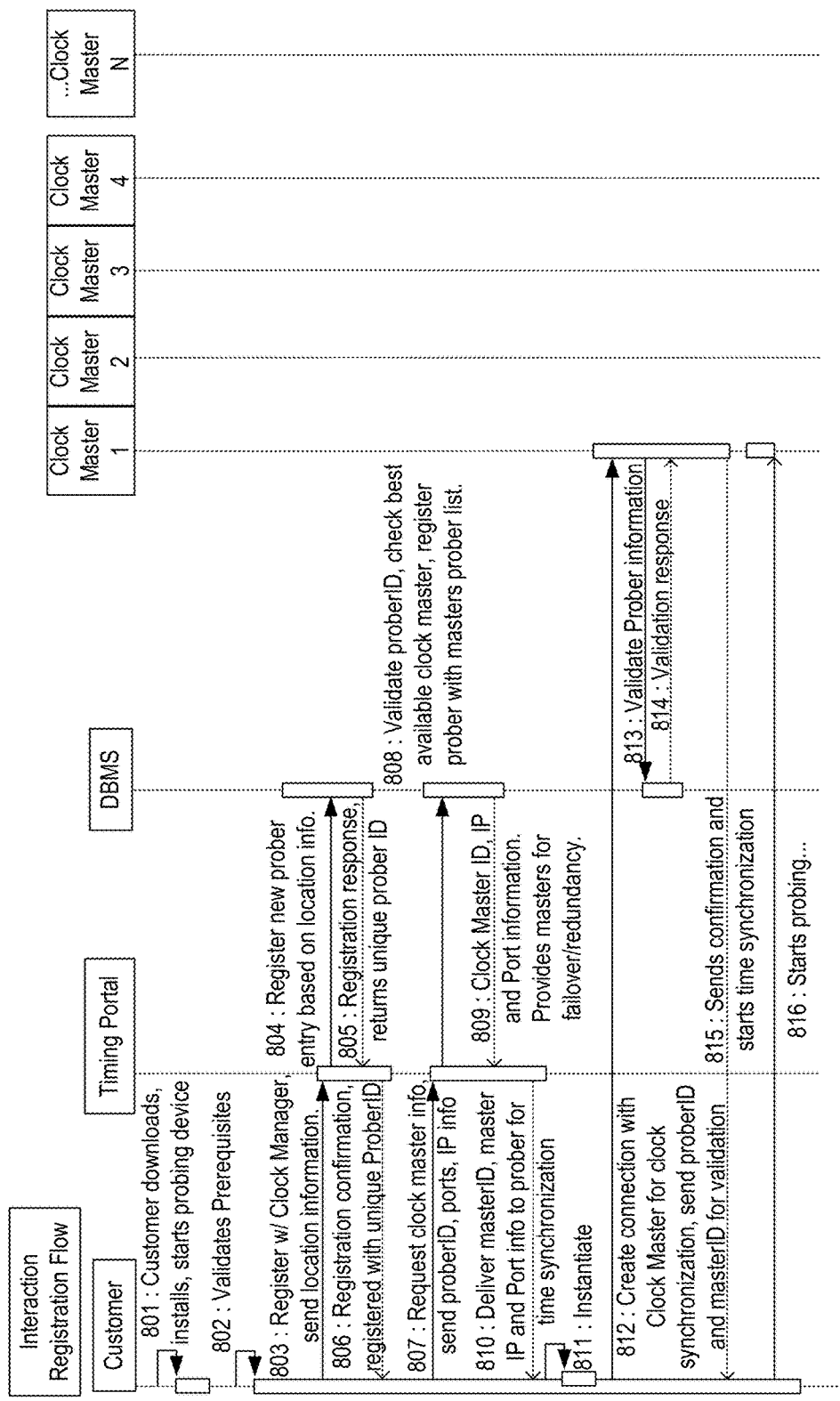
FIG. 8 is a flow diagram illustrating an example probing device client registration call flow, in accordance with one or more techniques of the current disclosure.

FIG. 8 is a flow diagram illustrating an example probing device client registration call, flow in accordance with one or more techniques of the current disclosure. These techniques describe the process of a timing portal operating on a specific client device to begin the process of probing for synchronization with one or more clock masters.

As described above with FIG. 7, the client device receives various user input to download, install, and execute the probing device program (801). Once the client device receives a confirmation of valid prerequisites (802), the timing portal receives a clock manager registration with location information (803). The timing portal registers the new prober entry with the database management system (DBMS) based on the location information (804). The DBMS responds with a unique prober ID (805), and the timing portal forwards this information to the client device (806).

The timing portal then receives a request for clock master information, along with the prober ID, port information, and IP information (807). The timing portal validates this information with the DBMS while also checking for the best available clock master (808). The DBMS sends the clock master ID of the best available clock master with IP and port information to the timing portal (809). The timing portal delivers this information to the client device (810), which instantiates the probing process (811).

As the first step of the probing process, the client device creates a connection with the clock master identified by the clock master ID received from the timing portal, sending prober ID and master ID information to the clock master for validation (812). The clock master validates the prober information with the DBMS (813), which replies with a validation response (814). The clock master sends the confirmation to the client device, beginning the time synchronization process (815). The client device then begins probing the clock master (816).

Figure 9:
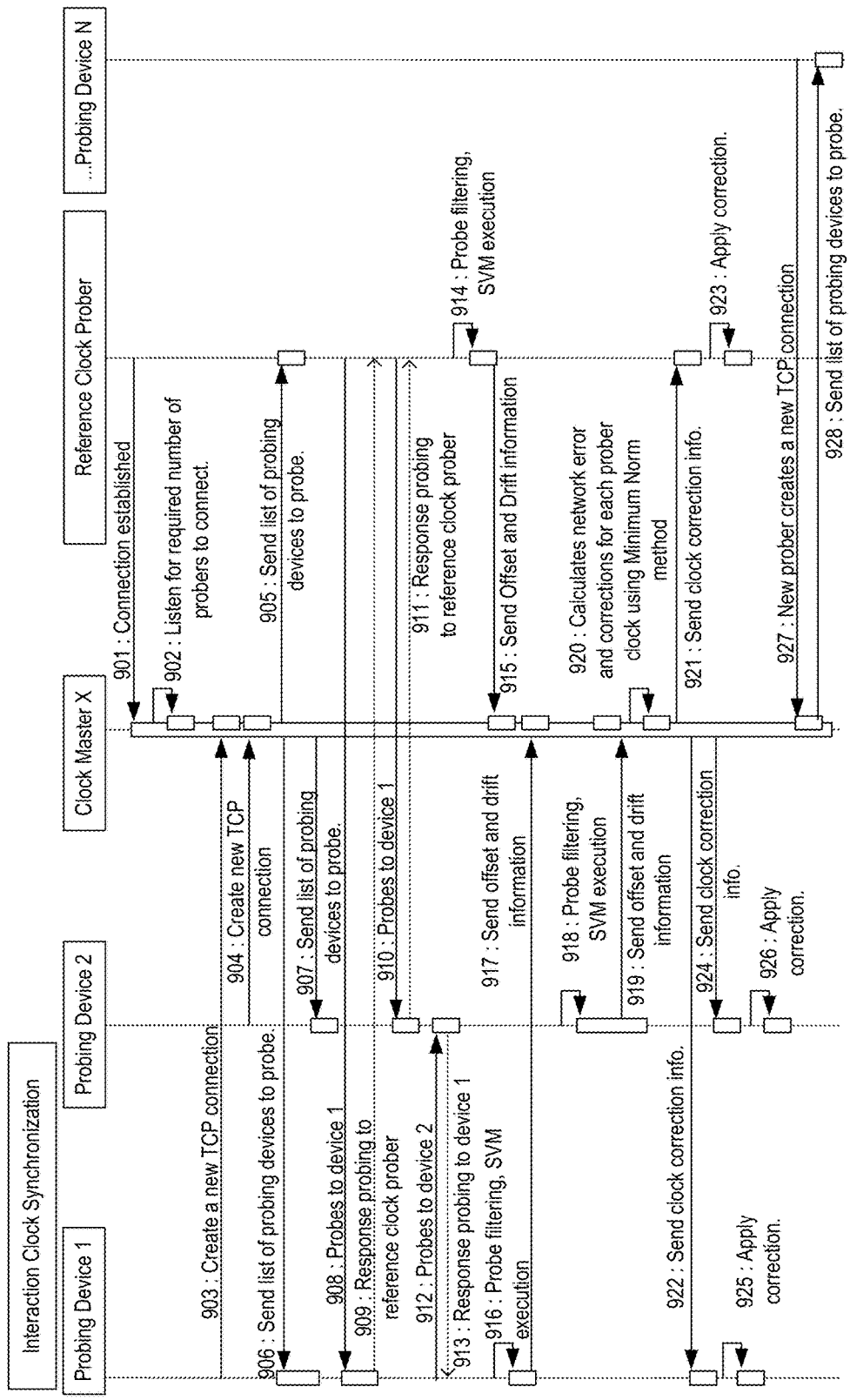
FIG. 9 is a flow diagram illustrating an example clock synchronization call flow, in accordance with one or more techniques of the current disclosure.

FIG. 9 is a flow diagram illustrating an example clock synchronization call, flow in accordance with one or more techniques of the current disclosure. In a given connected system, each prober pairs with one or more probers.

In accordance with one or more techniques described herein, the reference clock prober initiates this process by establishing the connection with the clock master (901). The clock master listens for a required number of probers to connect with (902). Probing device 1 (903) and probing device 2 (904) each create a new TCP connection with the clock master. The clock master responds by creating a list including each of these two probing devices and sending a list of probing devices to probe to each of the reference clock prober (905), probing device 1 (906), and probing device 2 (907).

The reference clock prober probes probing device 1 (908) and receives a response probing from probing device 1 (909). The reference clock prober also probes probing device 2 (911) and receives a response probing from probing device 2 (912). Probing device 1 may also probe probing device 2 (912) and receive a response probing from probing device 2 (913).

The reference clock prober, after performing the probing, may filter the probes and execute a virtual machine (914). The reference clock prober sends offset and drift information to the clock master. Probing device 1 (916, 917) and probing device 2 (918, 919) may also perform the filtering process and send the offset and drift information locally calculated to the clock master. The clock master uses all of this information to calculate network error and corrections for each clock using, for instance, a minimum norm method (920). The clock master sends the clock correction information to each of the reference clock prober (921), probing device 1 (922), and probing device 2 (924). Each of the reference clock prober (923), probing device 1 (925), and probing device 2 (926) apply these corrections.

At some point, the clock master may receive an indication of a new TCP connection created by probing device N (927). At this time, the clock master sends the list of probing devices to probe to probing device N, initiating another instance of the above process (928).

In a given interval, each pair of probers exchanges timestamps, multiple times, with each other by sending the probes and collecting their transmitting and receiving timestamps. Each probe is a pair of packets with time difference s. On receiving the probe on the other end, if the difference s' between pair of packets is greater than or less than s, then this indicates jitter and those probes are rejected. If s~s', those are considered pure probes and only their timestamp samples are collected. The forward and reverse probes gives upper bound and lower bound delta time values (from multiple exchanges) as show in FIG. 4. All of these values are fed to a non-linear models which gives us the slope and intercept values. Each prober sends its slope and intercept values to a local system clock master which calculates additional network effects and errors and return the corrections that each prober needs to apply to sync with a reference clock prober. These steps may repeated continuously to maintain the synchronization amongst each prober.

The local system clock master may use the probe values to determine a consensus for all probes in order to determine the correction for each clock. The correction for each clock may be used to synchronize local clients of the local master and may be used to synchronize remote clients of the primary master. To determine the consensus, clients may send the slope and intercept values their corresponding master (i.e., local or primary), which may apply the minimum normal solution to compute a consensus for the probes and determine the network effect corrections to be applied at different clocks.

In general, each node syncs to its own parent. Local clients sync to the local master, and the remote clients sync to the primary master. This produces a hierarchical network of networks by which corrections are distributed from higher-level nodes to lower-level nodes in the hierarchy for efficient distribution of corrections.

In accordance with the techniques described herein, a local system master clock includes one or more processors operably coupled to a memory and a synchronization engine executable by the one or more processors. The synchronization engine establishes a connection with a reference clock prober device. The synchronization engine establishes a transmission control protocol (TCP) connection with each of a plurality of probing devices. The synchronization engine sends, to the reference clock prober device, a first list identifying each of the probing devices in the plurality of probing devices. The synchronization engine also sends, to each of the plurality of probing devices, a respective list identifying every probing device other than the respective probing device in the plurality of probing devices. The synchronization engine receives, from each of the plurality of probing devices and the reference clock prober device, offset information for the respective device and drift information for the respective device. The synchronization engine calculates, for each of the plurality of probing devices and the reference clock prober device, and based on the offset information and drift information for each respective device, clock correction information for the respective device. The synchronization engine further calculates a network error. The synchronization engine sends, to each of the plurality of probing devices and the reference clock prober device, the clock correction information for the respective device and the network error.

Figure 10:
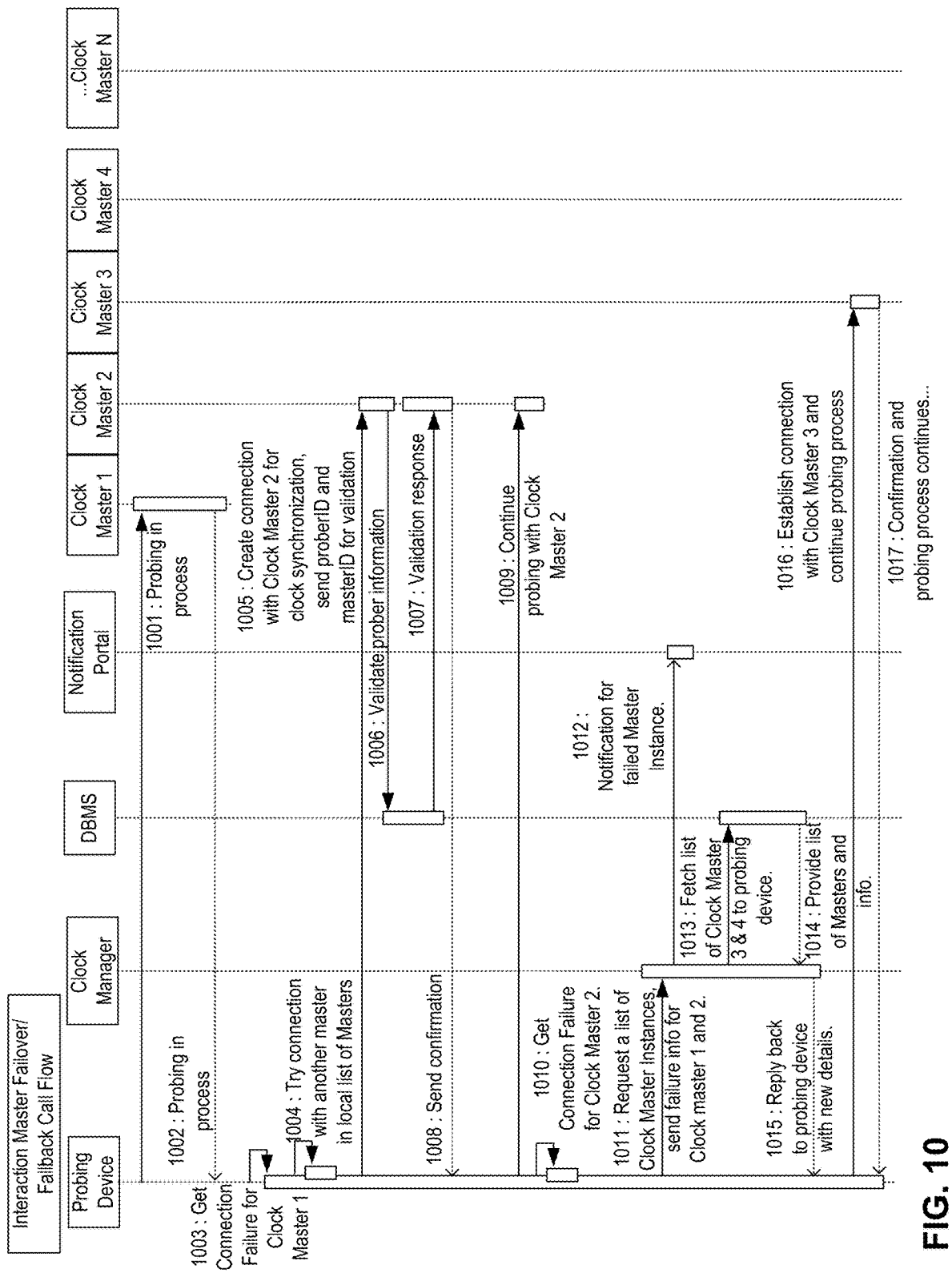
FIG. 10 is a flow diagram illustrating an example master or master-cluster failover call flow, in accordance with one or more techniques of the current disclosure.

FIG. 10 is a flow diagram illustrating an example master or master-cluster failover call, flow in accordance with one or more techniques of the current disclosure. This process describes the techniques implemented by the system when a clock master instance fails.

In accordance with the techniques described herein, the probing device is in the process of probing clock master 1 (1001, 1002). During the probing process, the probing device receives a connection failure for clock master 1 (1003). In response to detecting this failure, the probing device attempts to connect with another master in the local list of master devices (1004). The probing device successfully connects with clock master 2 for clock synchronization, sending the prober ID and master ID to clock master 2 for validation (1005). Clock master 2 validates (1006), and receives a validation response (1007), for the probing device. Clock master 2 sends the confirmation to the probing device (1008), and the probing device continues the probing process with clock master 2 (1009).

At a later time, the probing device may detect another connection failure, this time with clock master 2 (1010). After this second detection failure, the probing device requests a list of clock master instances from the clock manager, sending the clock manager failure information about clock masters 1 and 2 (1011). The clock manager forwards the failure information to the notification portal (1012). The clock manager also fetches a list that includes clock masters 3 and 4 from the DBMS (1013). The DBMS provides this list to the clock manager (1014), which forwards the list to the probing device (1015).

The probing device establishes a connection with clock master 3 to continue the probing process (1016). Clock master 3 sends the confirmation back to the probing device, and the probing process again continues (1017).

Figure 11:
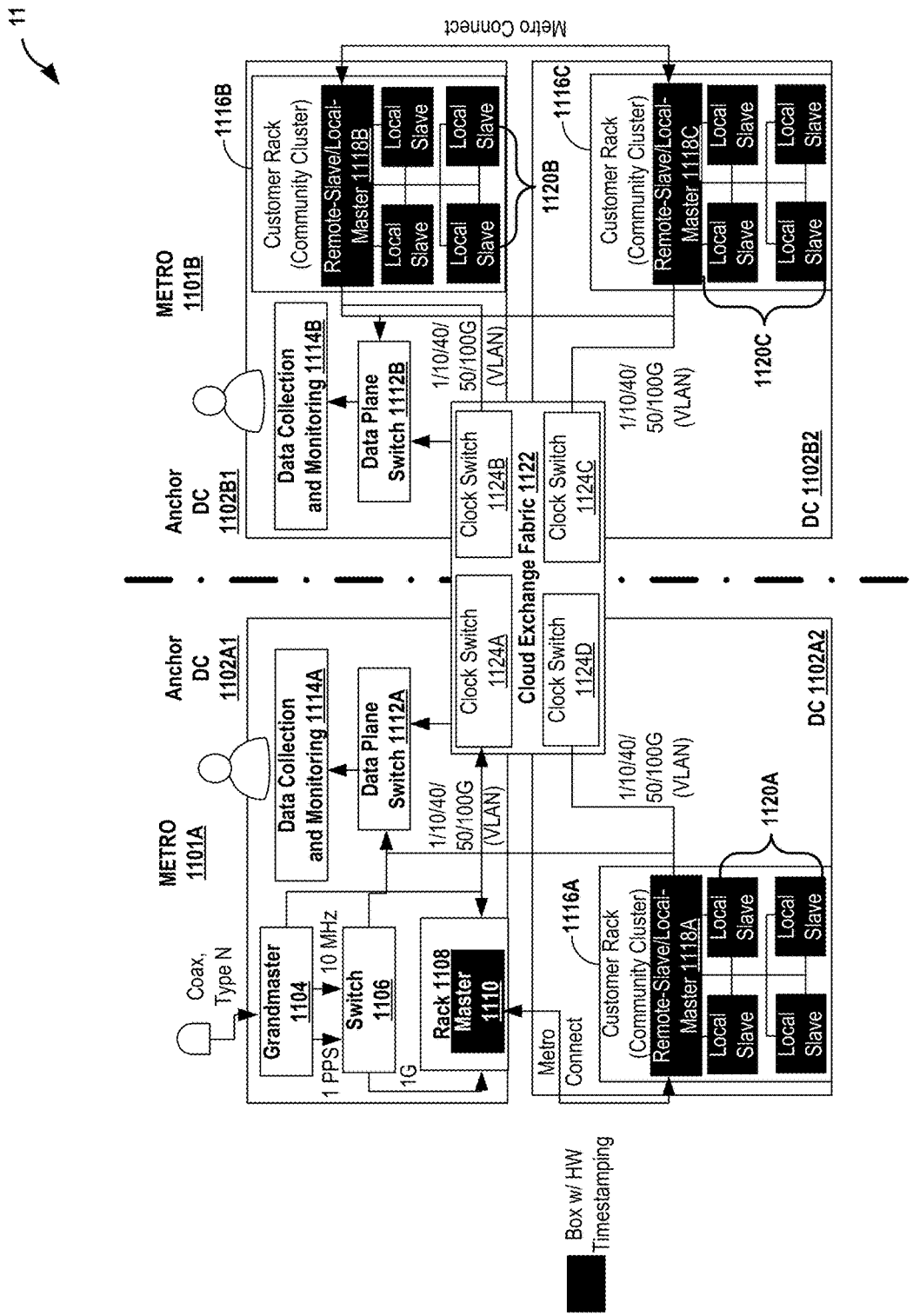
FIG. 11 is a block diagram illustrating an example precision timing system that distributes a time service using a cloud exchange fabric, in accordance with one or more techniques of the current disclosure.

FIG. 11 is a conceptual diagram illustrating an example cloud exchange fabric, in accordance with one or more techniques of the current disclosure. A globally distributed, easy-to-consume Time-as-a-Service (TaaS) technique may also be described herein. A design may be built on precision clocks and advanced algorithms to deliver accuracy to tens of nanoseconds while utilizing low cost and standard Ethernet distribution. These techniques may be unique in terms of using a single time source that provides accurate or precise time over greater distances than PTP and White Rabbit by using a cloud exchange with a software client and hardware timestamping NICs. The techniques described herein may be dynamically available based on a publisher or subscriber model and increasingly affordable as hardware costs of timestamping NICs are more commoditized. Further details of a cloud exchange are described in U.S. Pat. No. 9,948,552, issued Apr. 17, 2018; and U.S. Pat. No. 9,886,267, issued Feb. 6, 2018; each of which are incorporated by reference herein in its entirety.

Metro 1101A may include grandmaster 1104, which may be in communication with a GPS in order to get accurate timing information. Grandmaster 1104 communicates with switch 1106 to exchange the timing information. Switch 1106 may employ various time protocols, including PTP or White Rabbit. Switch 1106 forwards the timing information to primary master 1110, which resides in rack 1108 in anchor data center 1102A1. Using cloud exchange fabric 1122 with clock switches 1124A-1124D, master 1110 may synchronize timing across multiple other client devices, such as clients 1120A in customer rack 1116A at data center 1102A2 in metro 1101A or clients 1120B in customer rack 1116B at anchor data center 1102B1 in metro 1101B. Local master 1118B may then coordinate synchronizing the clocks with clients 1120C in customer rack 1116C at data center 1102B2 in metro 1101B. Local masters 1118A and 1118C may receive the timing information from master 1110 or local master 1118B and handle the distribution to the client devices at their respective location. Data collection and monitoring modules 1114A-1114B may collect timing information from client devices across the respective metro 1101A or 1101B in order to determine the synchronization information, e.g., the offset information. Data plane switches 1112A-1112B may be data planes within the network configured to communicate the data between devices over the network.

Leveraging the distribution capabilities of the cloud exchange, the timing service techniques described herein may be able to synchronize the servers at global scale. The solution may be deployed in a single data center, demonstrating that the techniques described herein may distribute <100 μs of accuracy to equipment in that same data center, to equipment in data centers in the same metro, to equipment in the data center it is directly connected to over the cloud exchange, and to equipment in the metro the solution is connected to over the cloud exchange.

Figure 12:
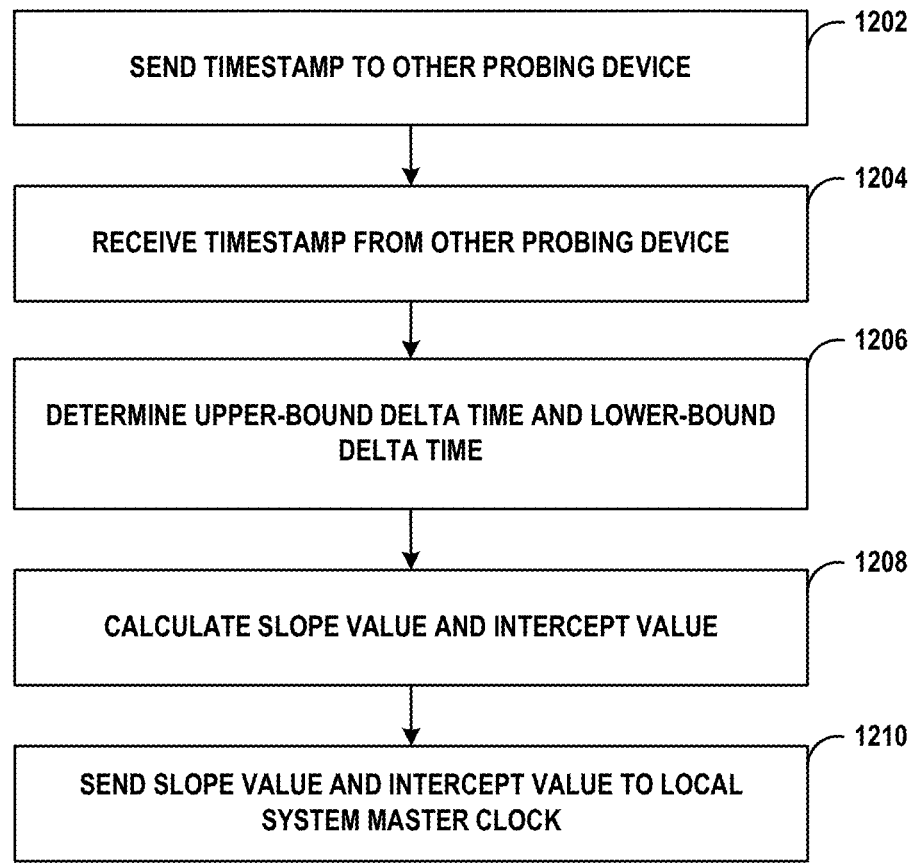
FIG. 12 is a flow diagram illustrating an example operation of a device, in accordance with one or more techniques of the current disclosure.

FIG. 12 is a flow diagram illustrating an example operation of a device, in accordance with one or more techniques of the current disclosure. FIG. 12 is described with reference to probing device 640 of FIG. 6. However, this process may also apply to any other probing device described herein.

In accordance with the techniques described herein, probing device 640 may send, in a network comprising a plurality of probing devices, and to a second probing device of the plurality of probing devices in the network, a timestamp for the first probing device (1202). Probing device 640 and the second probing device are included in a probing device pair. Probing device 640 receives, from the second probing device, a timestamp for the second probing device (1204). Probing device 640 determines, based at least in part on the timestamp for the first probing device and the timestamp for the second probing device, an upper-bound delta time and a lower-bound delta time for the probing device pair (1206). Probing device 640 calculates, based at least in part on the upper-bound delta time and the lower-bound delta time for the probing device pair, a slope value and an intercept value for probing device 640 (1208). Probing device 640 sends, to a local system master clock (e.g., master device 540 of FIG. 5), the slope value and the intercept value for probing device 640 (1210).

Figure 13:
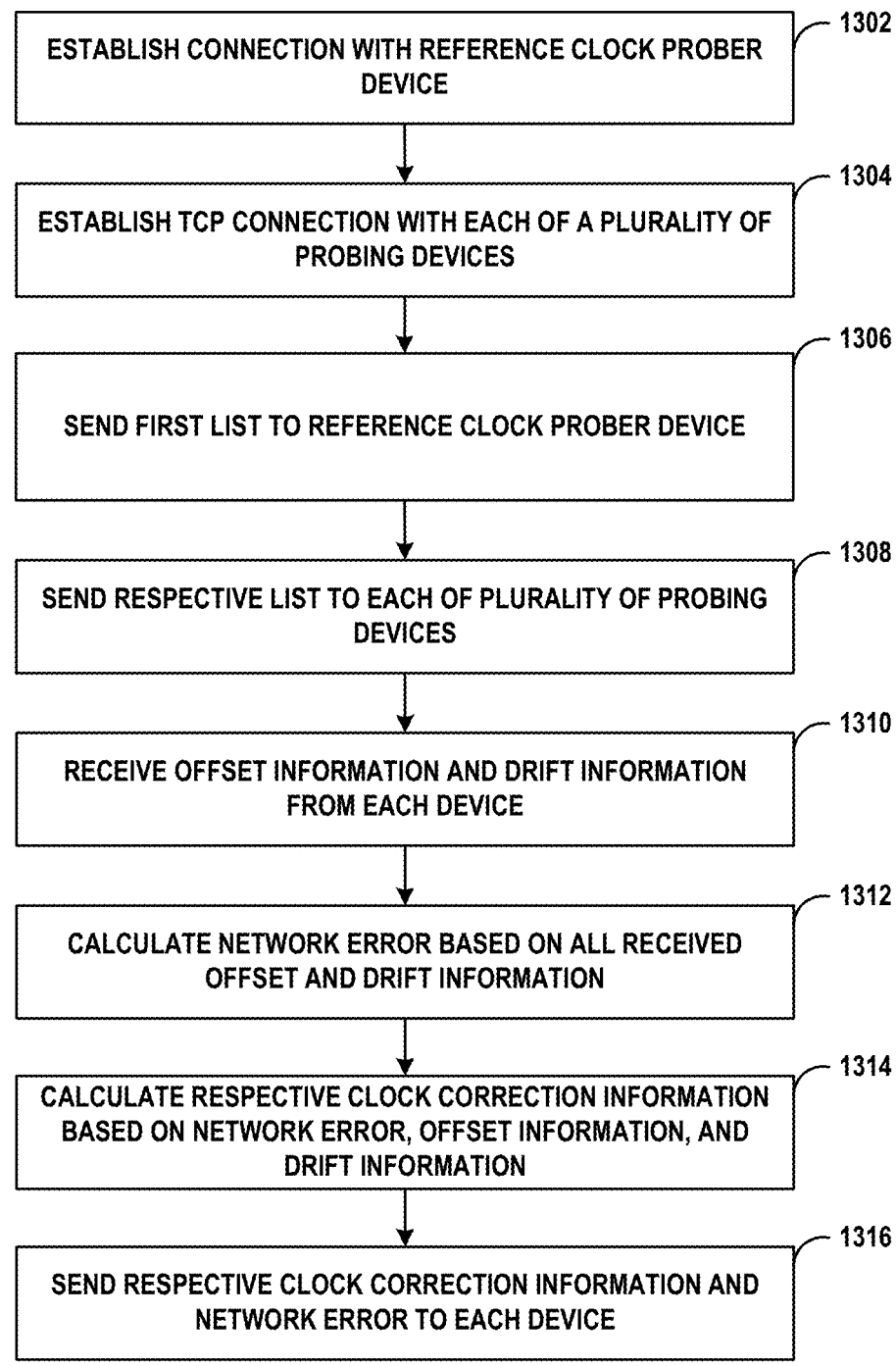
FIG. 13 is a flow diagram illustrating an example operation of a device, in accordance with one or more techniques of the current disclosure.

FIG. 13 is a flow diagram illustrating an example operation of a device, in accordance with one or more techniques of the current disclosure. FIG. 13 is described with reference to master device 540 of FIG. 5. However, this process may also apply to any other probing device described herein.

In further accordance with the techniques described herein, synchronization engine 554 establishes a connection with a reference clock prober device (1302). Synchronization engine 554 establishes a transmission control protocol (TCP) connection with each of a plurality of probing devices (1304). Each probing device of the plurality of the probing devices is a client of the local system master clock, and the local system master clock is located in a same data center as each of the plurality of probing devices. Synchronization engine 554 sends, to the reference clock prober device, a first list identifying each of the probing devices in the plurality of probing devices (1306). Synchronization engine 554 also sends, to each of the plurality of probing devices, a respective list identifying every probing device other than the respective probing device in the plurality of probing devices (1308).

Synchronization engine 554 receives, from each of the plurality of probing devices and the reference clock prober device, respective offset information and respective drift information for the probing devices and for the reference clock prober device (1310). Synchronization engine 554 calculates a network error based on the respective offset information and the respective drift information for all of the probing devices and the reference clock prober device (1312). Synchronization engine 554 further calculates respective clock correction information for all of the probing devices and for the reference clock prober device based on the network error and the respective offset information and respective drift information for the probing devices and the reference clock prober device (1314). Synchronization engine 554 sends the respective clock correction information and the network error to the probing devices and to the reference clock prober device (1316).

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors comprising processing circuitry, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated.

What is claimed is:

1. A method comprising:
sending, by a first probing device in a network comprising a plurality of probing devices, and to a second probing device of the plurality of probing devices in the network, a timestamp for the first probing device, wherein the first probing device and the second probing device are included in a probing device pair;
receiving, by the first probing device, and from the second probing device, a timestamp for the second probing device;
determining, by the first probing device, a timestamp offset between the timestamp for the first probing device and the timestamp for the second probing device;
receiving, by the first probing device, an independent timestamp offset for the probing device pair;
when the timestamp offset is classified as a valid timestamp offset based on a difference between the timestamp offset and the independent timestamp offset for the probing device pair, determining, by the first probing device, based at least in part on the timestamp for the first probing device and the timestamp for the second probing device, an upper-bound delta time and a lower-bound delta time for the probing device pair;
calculating, by the first probing device, and based at least in part on the upper-bound delta time and the lower-bound delta time for the probing device pair, a slope value and an intercept value for the first probing device; and
sending, by the first probing device, and to a local system master clock, the slope value and the intercept value for the first probing device.

2. The method of claim 1, further comprising:
comparing, by the first probing device, the timestamp offset and the independent timestamp offset; and
responsive to determining that the timestamp offset is approximately equal to the independent timestamp offset, classifying, by the first probing device, the timestamp offset as a valid timestamp offset.

3. The method of claim 1, further comprising:
sending, by the first probing device, and to the second probing device of the plurality of probing devices in the network, a second timestamp for the first probing device;
receiving, by the first probing device, and from the second probing device, a second timestamp for the second probing device;
determining, by the first probing device, a second timestamp offset between the second timestamp for the first probing device and the second timestamp for the second probing device;
comparing, by the first probing device, the second timestamp offset and the independent timestamp offset;
responsive to determining that the second timestamp offset is not approximately equal to the independent timestamp offset, classifying, by the first probing device, second the timestamp offset as an invalid timestamp offset; and responsive to classifying the second timestamp offset as an invalid timestamp offset, refraining, by the first probing device, from determining a second upper-bound delta time and a second lower-bound delta time for the probing device pair based on the second timestamp offset.

4. The method of claim 1, further comprising:
sending, by the first probing device, and to the second probing device of the plurality of probing devices in the network, a second timestamp for the first probing device;
receiving, by the first probing device, and from the second probing device, a second timestamp for the second probing device;
determining, by the first probing device, based at least in part on the timestamp for the first probing device, the timestamp for the second probing device, the second timestamp for the first probing device, and the second timestamp for the second probing device, the upper-bound delta time and the lower-bound delta time for the probing device pair;
calculating, by the first probing device, and based at least in part on the upper-bound delta time and the lower-bound delta time for the probing device pair, the slope value and the intercept value for the first probing device; and
sending, by the first probing device, and to the local system master clock, the slope value and the intercept value for the first probing device.

5. The method of claim 4, further comprising:
sending, by the first probing device, and to the second probing device of the plurality of probing devices in the network, a third timestamp for the first probing device;
receiving, by the first probing device, and from the second probing device, a third timestamp for the second probing device;
determining, by the first probing device, and based at least in part on the third timestamp for the first probing device, the third timestamp for the second probing device, the upper-bound delta time for the probing device pair, and the lower-bound delta time for the probing device pair, an updated upper-bound delta time and an updated lower-bound delta time for the probing device pair;
calculating, by the first probing device, and based at least in part on the updated upper-bound delta time and the updated lower-bound delta time for the probing device pair, an updated slope value and an updated intercept value for the first probing device; and
sending, by the first probing device, and to the local system master clock, the updated slope value and the updated intercept value for the first probing device.

6. The method of claim 1, further comprising:
receiving, by the first probing device, and from the local system master clock, a reference clock probe that includes a time synchronization offset for the first probing device; and
synchronizing, by the first probing device, and based at least in part on the time synchronization offset, a clock on the first probing device.

7. The method of claim 1, wherein sending the timestamp for the first probing device comprises:
sending, by the first probing device, and to the second probing device, a probe packet that includes the timestamp for the first probing device.

8. The method of claim 1, wherein calculating the slope value and the intercept value for the first probing device comprises:
- creating, by the first probing device, a non-linear model; and
- calculating, by the first probing device, and using the non-linear model, the upper-bound delta time, and the lower-bound delta time, the slope value and the intercept value for the first probing device.

9. The method of claim 1, further comprising:
- sending, by the first probing device, and to a third probing device of the plurality of probing devices in the network, a second timestamp for the first probing device, wherein the first probing device and the third probing device are included in a second probing device pair;
- receiving, by the first probing device, and from the third probing device, a timestamp for the third probing device;
- determining, by the first probing device, based at least in part on the second timestamp for the first probing device and the timestamp for the third probing device, an upper-bound delta time and a lower-bound delta time for the second probing device pair;
- calculating, by the first probing device, and based at least in part on the upper-bound delta time and the lower-bound delta time for the probing device pair and the upper-bound delta time and the lower-bound delta time for the second probing device pair, the slope value and the intercept value for the first probing device.

10. A first probing device comprising:
- one or more processors operably coupled to a memory; and
- a synchronization engine executable by the one or more processors to:
  - send, to a second probing device of a plurality of probing devices in a network, a timestamp for the first probing device, wherein the first probing device and the second probing device are included in a probing device pair;
  - receive, from the second probing device, a timestamp for the second probing device;
  - determine a timestamp offset between the timestamp for the first probing device and the timestamp for the second probing device;
  - receive an independent timestamp offset for the probing device pair;
  - when the timestamp offset is classified as a valid timestamp offset based on a difference between the timestamp offset and the independent timestamp offset for the probing device pair;
  - determine, based at least in part on the timestamp for the first probing device and the timestamp for the second probing device, an upper-bound delta time and a lower-bound delta time for the probing device pair;
  - calculate, based at least in part on the upper-bound delta time and the lower-bound delta time for the probing device pair, a slope value and an intercept value for the first probing device; and
  - send, to a local system master clock, the slope value and the intercept value for the first probing device.

11. The first probing device of claim 10, wherein the synchronization engine is further executable by the one or more processors to:
- compare the timestamp offset and the independent timestamp offset; and responsive to determining that the timestamp offset is approximately equal to the independent timestamp offset, classify the timestamp offset as a valid timestamp offset.

12. The first probing device of claim 10, wherein the synchronization engine is further executable by the one or more processors to:
- send, to the second probing device of the plurality of probing devices in the network, a second timestamp for the first probing device;
- receive, from the second probing device, a second timestamp for the second probing device;
- determine a second timestamp offset between the second timestamp for the first probing device and the second timestamp for the second probing device;
- compare the second timestamp offset and the independent timestamp offset;
- responsive to determining that the second timestamp offset is not approximately equal to the independent timestamp offset, classify the second timestamp offset as an invalid timestamp offset; and
- responsive to classifying the second timestamp offset as an invalid timestamp offset, refrain from determining a second upper-bound delta time and a second lower-bound delta time for the probing device pair based on the second timestamp offset.

13. The first probing device of claim 10, wherein the synchronization engine is further executable by the one or more processors to:
- send, to the second probing device of the plurality of probing devices in the network, a second timestamp for the first probing device;
- receive, from the second probing device, a second timestamp for the second probing device;
- determine, based at least in part on the timestamp for the first probing device, the timestamp for the second probing device, the second timestamp for the first probing device, and the second timestamp for the second probing device, the upper-bound delta time and the lower-bound delta time for the probing device pair;
- calculate, based at least in part on the upper-bound delta time and the lower-bound delta time for the probing device pair, the slope value and the intercept value for the first probing device; and
- send, to the local system master clock, the slope value and the intercept value for the first probing device.

14. The first probing device of claim 13, wherein the synchronization engine is further executable by the one or more processors to:
- send, to the second probing device of the plurality of probing devices in the network, a third timestamp for the first probing device;
- receive, from the second probing device, a third timestamp for the second probing device;
- determine, based at least in part on the third timestamp for the first probing device, the third timestamp for the second probing device, the upper-bound delta time for the probing device pair, and the lower-bound delta time for the probing device pair, an updated upper-bound delta time and an updated lower-bound delta time for the probing device pair;
- calculate, based at least in part on the updated upper-bound delta time and the updated lower-bound delta time for the probing device pair, an updated slope value and an updated intercept value for the first probing device; and
- send, to the local system master clock, the updated slope value and the updated intercept value for the first probing device.

15. The first probing device of claim 10, wherein the synchronization engine is further executable by the one or more processors to:
receive, from the local system master clock, a reference clock probe that includes a time synchronization offset for the first probing device; and
synchronize, based at least in part on the time synchronization offset, a clock on the first probing device.

16. The first probing device of claim 10, wherein the synchronization engine being executable by the one or more processors to send the timestamp for the first probing device comprises the synchronization engine being executable by the one or more processors to send, to the second probing device, a probe packet that includes the timestamp for the first probing device.

17. The first probing device of claim 10, wherein the synchronization engine being executable by the one or more processors to calculate the slope value and the intercept value for the first probing device comprises the synchronization engine being executable by the one or more processors to:
create a non-linear model; and
calculate, using the non-linear model, the upper-bound delta time, and the lower-bound delta time, the slope value and the intercept value for the first probing device.

18. A network system comprising:
a first probing device;
a second probing device; and
a local system master clock,
wherein the first probing device is configured to
send, to the second probing device, a timestamp for the first probing device, wherein the first probing device and the second probing device are included in a probing device pair;
receive, from the second probing device, a timestamp for the second probing device;
determine a timestamp offset between the timestamp for the first probing device and the timestamp for the second probing device;
receive an independent timestamp offset for the probing device pair;
when the determined timestamp offset is classified as a valid timestamp offset based on a difference between the determined timestamp offset and the independent timestamp offset for the probing device pair, determine, based at least in part on the timestamp for the first probing device and the timestamp for the second probing device, an upper-bound delta time and a lower-bound delta time for the probing device pair;
calculate, based at least in part on the upper-bound delta time and the lower-bound delta time for the probing device pair, a slope value and an intercept value for the first probing device; and
send, to the local system master clock, the slope value and the intercept value for the first probing device, and wherein the local system master clock is configured to:
receive, from the first probing device, the slope value and the intercept value for the first probing device;
calculate, based at least in part on the slope value and the intercept value for the first probing device, a timestamp offset for the first probing device;
determine a network error in a network that includes the local system master clock and the first probing device;
update the timestamp offset for the first probing device based on the network error; and
send, to the first probing device, the updated timestamp offset for the first probing device.

19. A local system master clock comprising:
one or more processors operably coupled to a memory; and
a synchronization engine executable by the one or more processors to:
establish a connection with a reference clock prober device;
establish a transmission control protocol (TCP) connection with each of a plurality of probing devices, wherein each probing device of the plurality of the probing devices is a client of the local system master clock, and wherein the local system master clock is located in a same data center as each of the plurality of probing devices;
send, to the reference clock prober device, a first list identifying each of the probing devices in the plurality of probing devices;
send, to each probing device of the plurality of probing devices, a corresponding list identifying every probing device other than the probing device in the plurality of probing devices;
receive, from the probing devices and the reference clock prober device, respective offset information and respective drift information for all of the probing devices and for the reference clock prober device, wherein the offset information comprises, for each of the probing devices, a timestamp offset classified as a valid timestamp offset based on a difference between the timestamp offset and an independent timestamp offset for a pair of the probing devices;
calculate a network error based on the respective offset information and the respective drift information for all of the probing devices and the reference clock prober device;
calculate respective clock correction information for all of the probing devices and for the reference clock prober device based on the network error and the respective offset information and respective drift information for all of the probing devices and the reference clock prober device; and
send the respective clock correction information to the probing devices and to the reference clock prober device.

* * * * *